US012684601B2

(12) United States Patent
Yoshioka et al.

(10) Patent No.: US 12,684,601 B2
(45) Date of Patent: Jul. 14, 2026

(54) TERMINAL AND RESOURCE CONTROL METHOD

(71) Applicant: NTT DOCOMO, INC., Tokyo (JP)

(72) Inventors: Shohei Yoshioka, Tokyo (JP); Naoya Shibaike, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 393 days.

(21) Appl. No.: 18/246,412

(22) PCT Filed: Sep. 29, 2020

(86) PCT No.: PCT/JP2020/037033
§ 371 (c)(1),
(2) Date: Mar. 23, 2023

(87) PCT Pub. No.: WO2022/070284
PCT Pub. Date: Apr. 7, 2022

(65) Prior Publication Data
US 2023/0371051 A1      Nov. 16, 2023

(51) Int. Cl.
| | |
|---|---|
| *H04W 4/00* | (2018.01) |
| *H04W 72/02* | (2009.01) |
| *H04W 72/25* | (2023.01) |
| *H04W 72/40* | (2023.01) |

(52) U.S. Cl.
CPC ........... H04W 72/40 (2023.01); H04W 72/02 (2013.01); H04W 72/25 (2023.01)

(58) Field of Classification Search
CPC ..... H04W 72/40; H04W 72/02; H04W 72/25;

H04W 92/18; H04W 28/04; H04W 72/04; H04W 72/042; H04W 88/08; H04W 28/08; H04W 28/084; H04W 36/22; H04W 72/12; H04L 5/0007
See application file for complete search history.

(56) References Cited

U.S. PATENT DOCUMENTS

| | | | | |
|---|---|---|---|---|
| 11,178,578 | B2 * | 11/2021 | Huang ................... | H04W 72/04 |
| 12,058,678 | B2 * | 8/2024 | Lee ........................ | H04W 72/20 |
| 2020/0092685 | A1 * | 3/2020 | Fehrenbach .......... | H04W 72/23 |
| 2021/0014831 | A1 * | 1/2021 | Ryu ...................... | H04L 5/0092 |

(Continued)

FOREIGN PATENT DOCUMENTS

WO      WO-2022070284 A1 *   4/2022   ........... H04W 92/18

OTHER PUBLICATIONS

International Search Report issued in PCT/JP2020/037033 on May 18, 2021 (5 pages).

(Continued)

*Primary Examiner* — Phuongchau Ba Nguyen
(74) *Attorney, Agent, or Firm* — Osha Bergman Watanabe & Burton LLP

(57) ABSTRACT

Provided is a terminal including: a receiving unit that acquires any one or both position information of a reception terminal and position information of a third terminal; and a control unit that performs resource exclusion processing by a specific method with respect to a reserved resource by the third terminal within a specific range from the reception terminal on the basis of the position information acquired by the receiving unit in identification processing of candidates of a transmission resource that is used in a sidelink.

6 Claims, 22 Drawing Sheets

(56) References Cited

U.S. PATENT DOCUMENTS

| | | | | |
|---|---|---|---|---|
| 2021/0144750 | A1* | 5/2021 | Cao | H04W 72/0453 |
| 2021/0297221 | A1* | 9/2021 | Lee | H04L 1/1812 |
| 2022/0191919 | A1* | 6/2022 | Lee | H04W 72/23 |
| 2023/0276461 | A1* | 8/2023 | Lee | H04W 72/02 |
| | | | | 370/329 |
| 2023/0284097 | A1* | 9/2023 | Nguyen | H04W 28/26 |
| | | | | 370/229 |

OTHER PUBLICATIONS

Written Opinion of the International Searching Authority issued in PCT/JP2020/037033 on May 18, 2021 (3 pages).
3GPP TS 38.331 V16.1.0; "3rd Generation Partnership Project; Technical Specification Group Radio Access Network; NR; Radio Resource Control (RRC) protocol specification (Release 16)" Jul. 2020 (906 pages).
3GPP TS 38.214 V16.2.0; "3rd Generation Partnership Project; Technical Specification Group Radio Access Network; NR; Physical layer procedures for data (Release 16)"; Jun. 2020 (163 pages).
3GPP TS 38.321 V16.1.0; "3rd Generation Partnership Project; Technical Specification Group Radio Access Network; NR; Medium Access Contol (MAC) protocol specification (Release 16)"; Jul. 2020 (151 pages).

* cited by examiner

[FIG. 1]
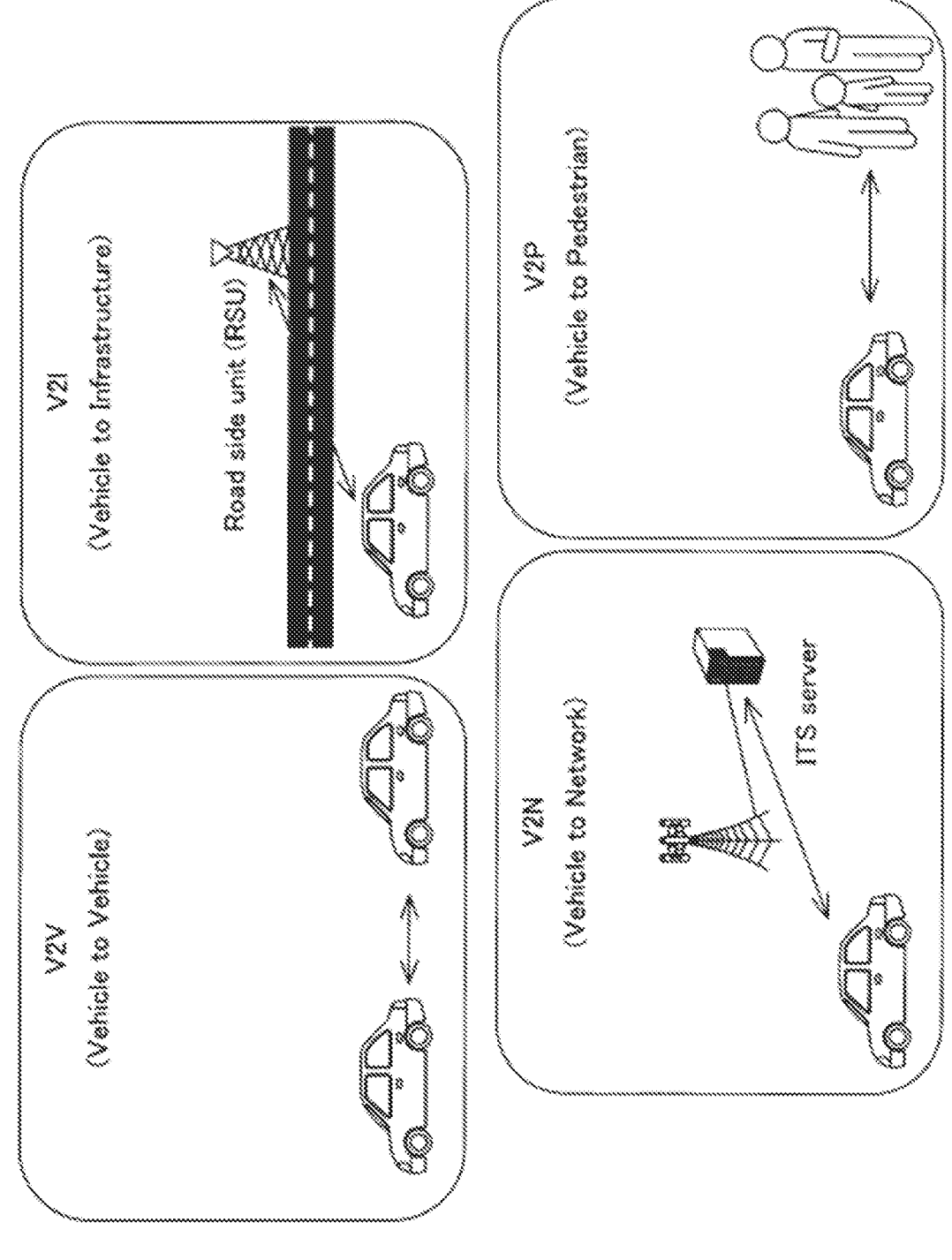

[FIG. 2]
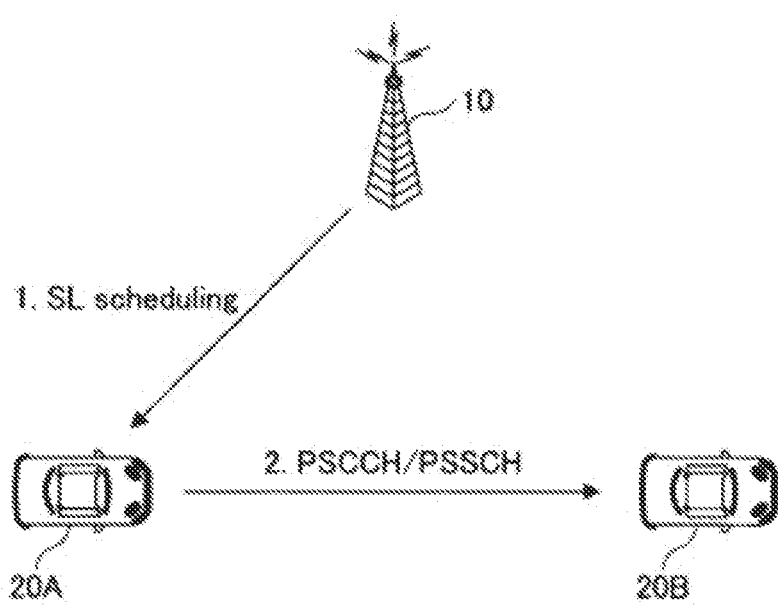
[FIG. 3]
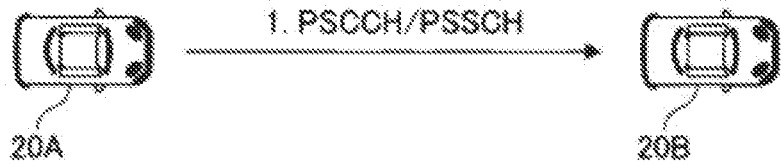
[FIG. 4]
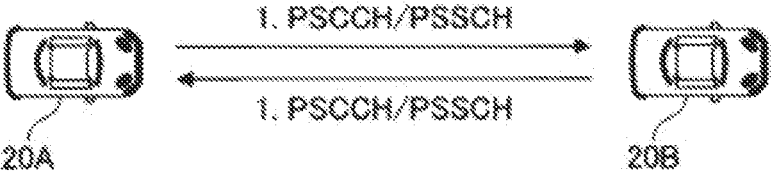

[FIG. 5]
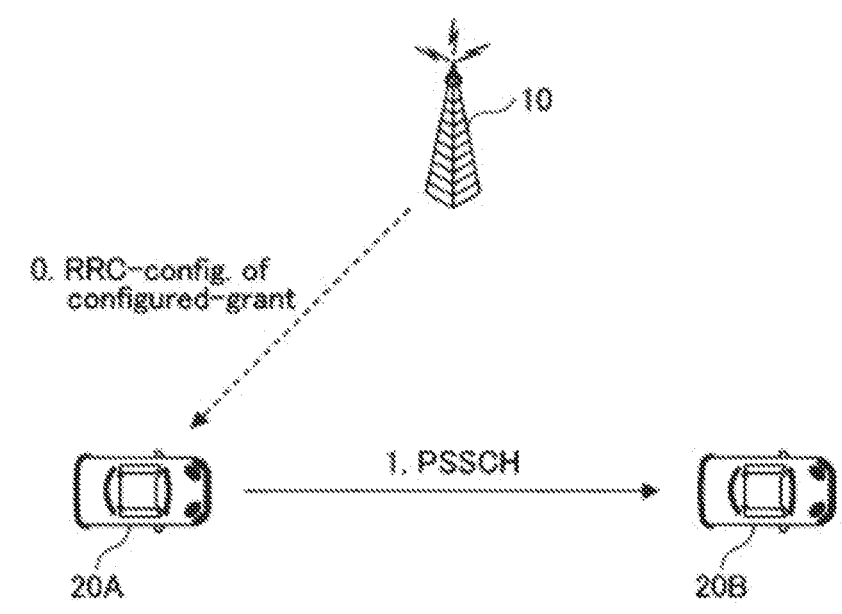
[FIG. 6]
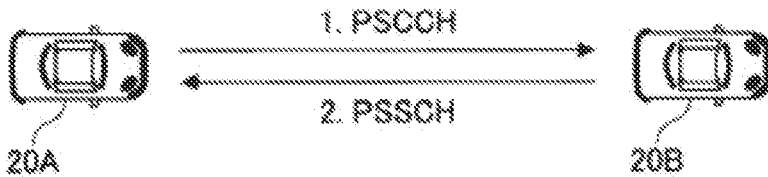

[FIG. 7]
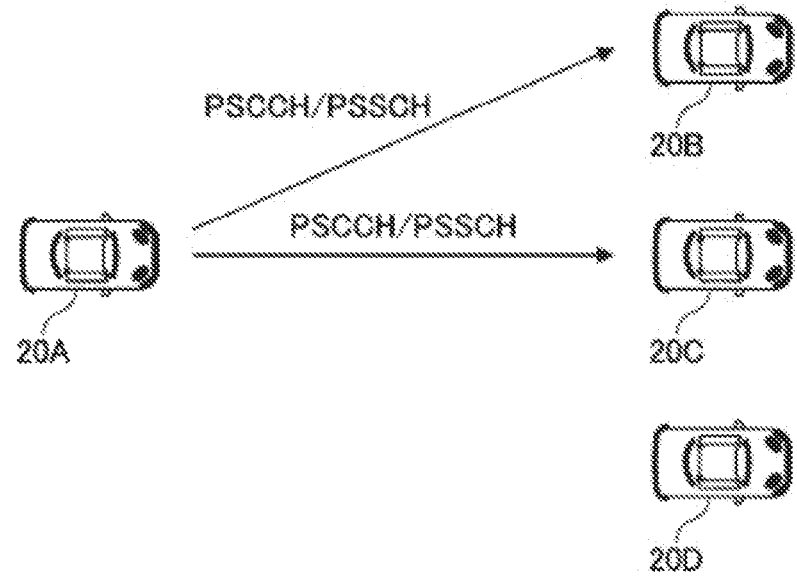
[FIG. 8]
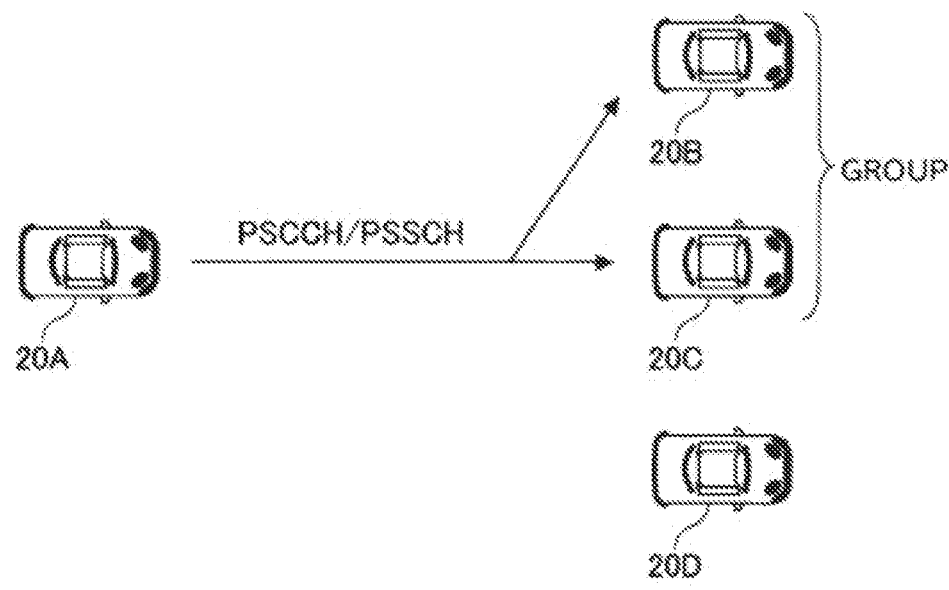

[FIG. 9]
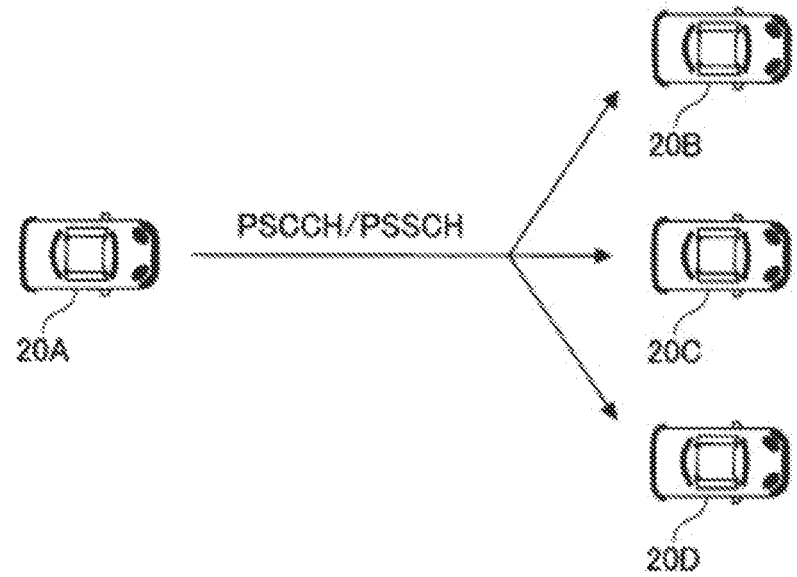
[FIG. 10]
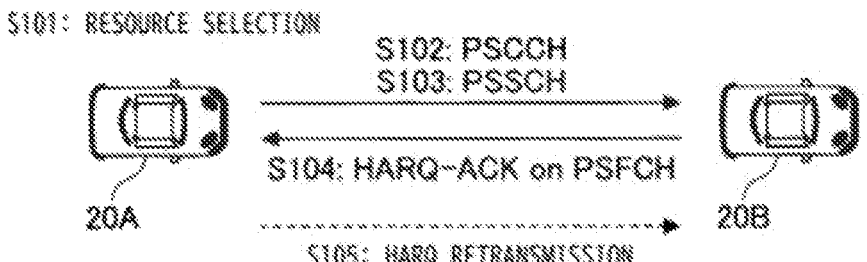
[FIG. 11]
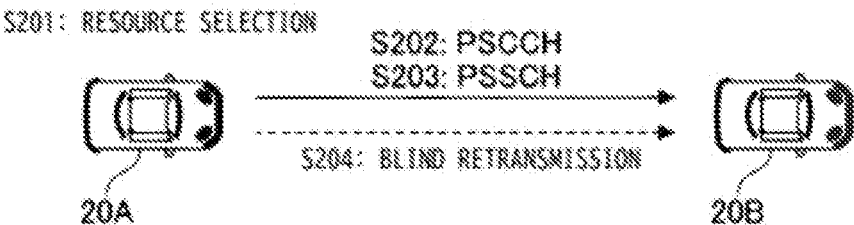

[FIG. 12]
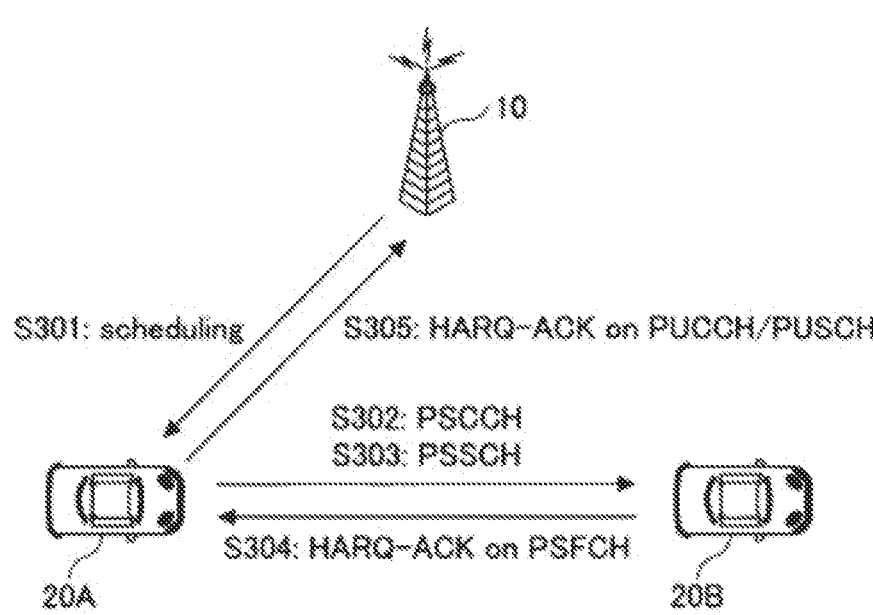

[FIG. 13]
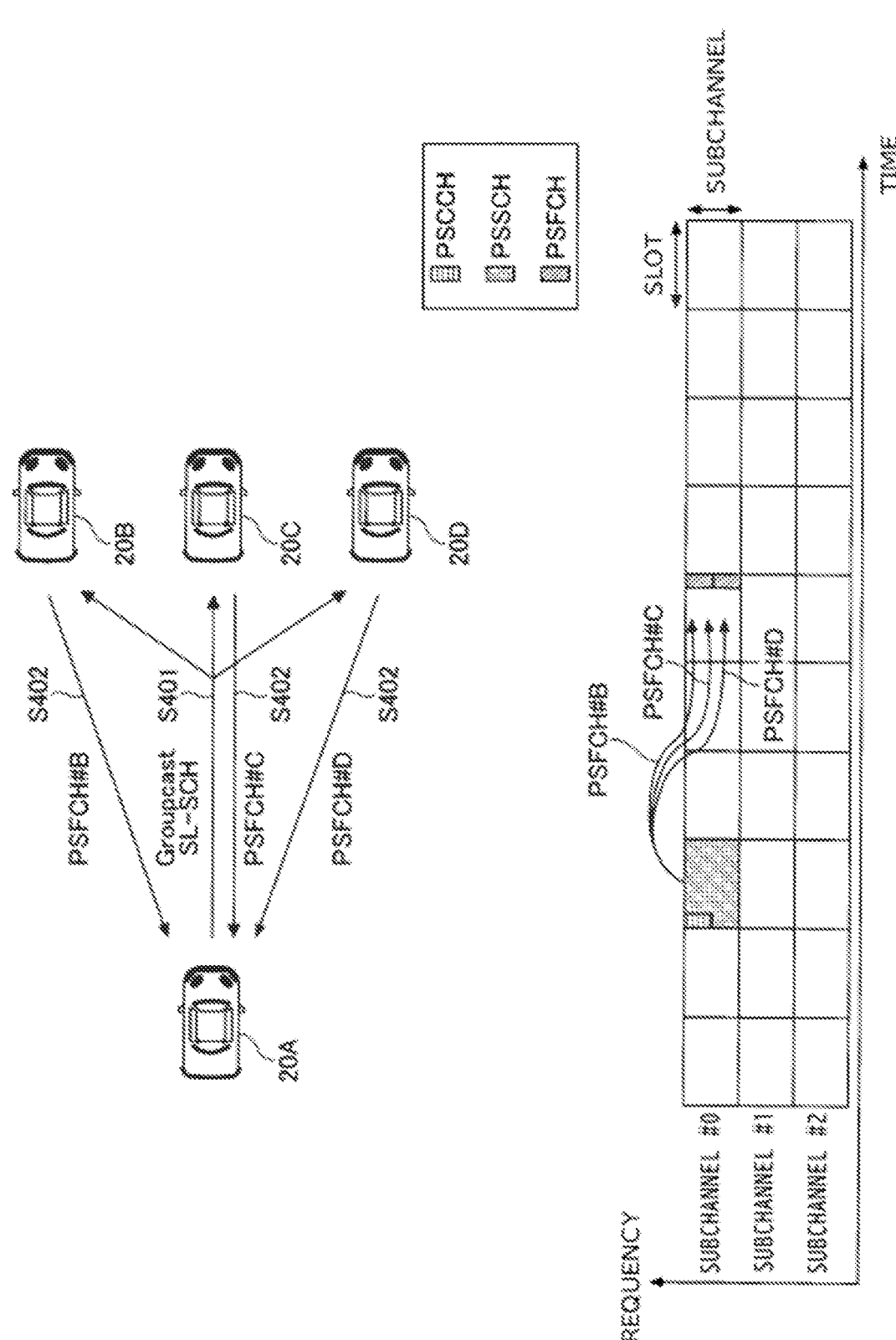

[FIG. 14]

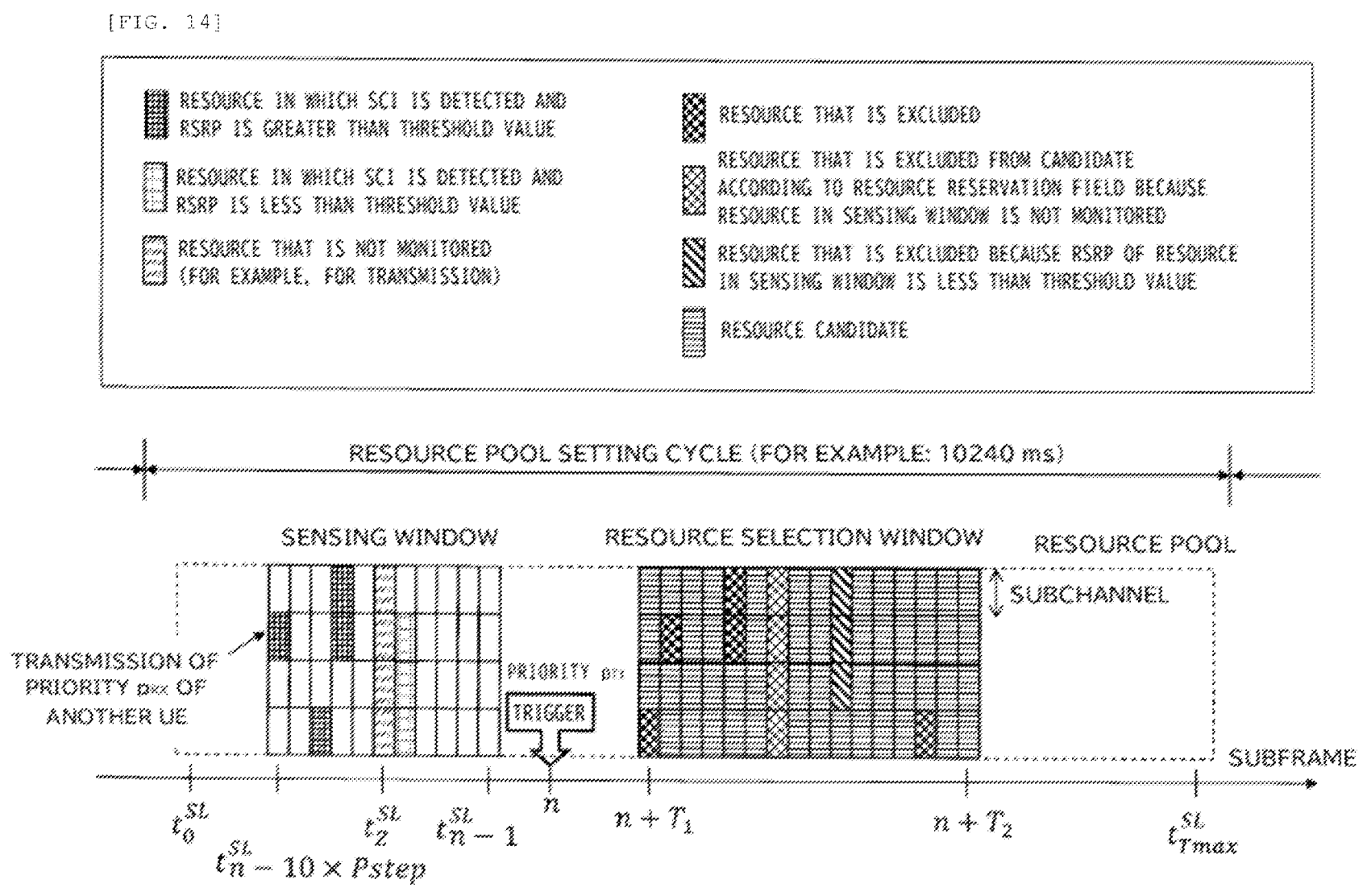

RESOURCE IN WHICH SCI IS DETECTED AND
RSRP IS GREATER THAN THRESHOLD VALUE

RESOURCE IN WHICH SCI IS DETECTED AND
RSRP IS LESS THAN THRESHOLD VALUE

RESOURCE THAT IS NOT MONITORED
(FOR EXAMPLE, FOR TRANSMISSION)

RESOURCE THAT IS EXCLUDED

RESOURCE THAT IS EXCLUDED FROM CANDIDATE
ACCORDING TO RESOURCE RESERVATION FIELD BECAUSE
RESOURCE IN SENSING WINDOW IS NOT MONITORED

RESOURCE THAT IS EXCLUDED BECAUSE RSRP OF RESOURCE
IN SENSING WINDOW IS LESS THAN THRESHOLD VALUE

RESOURCE CANDIDATE

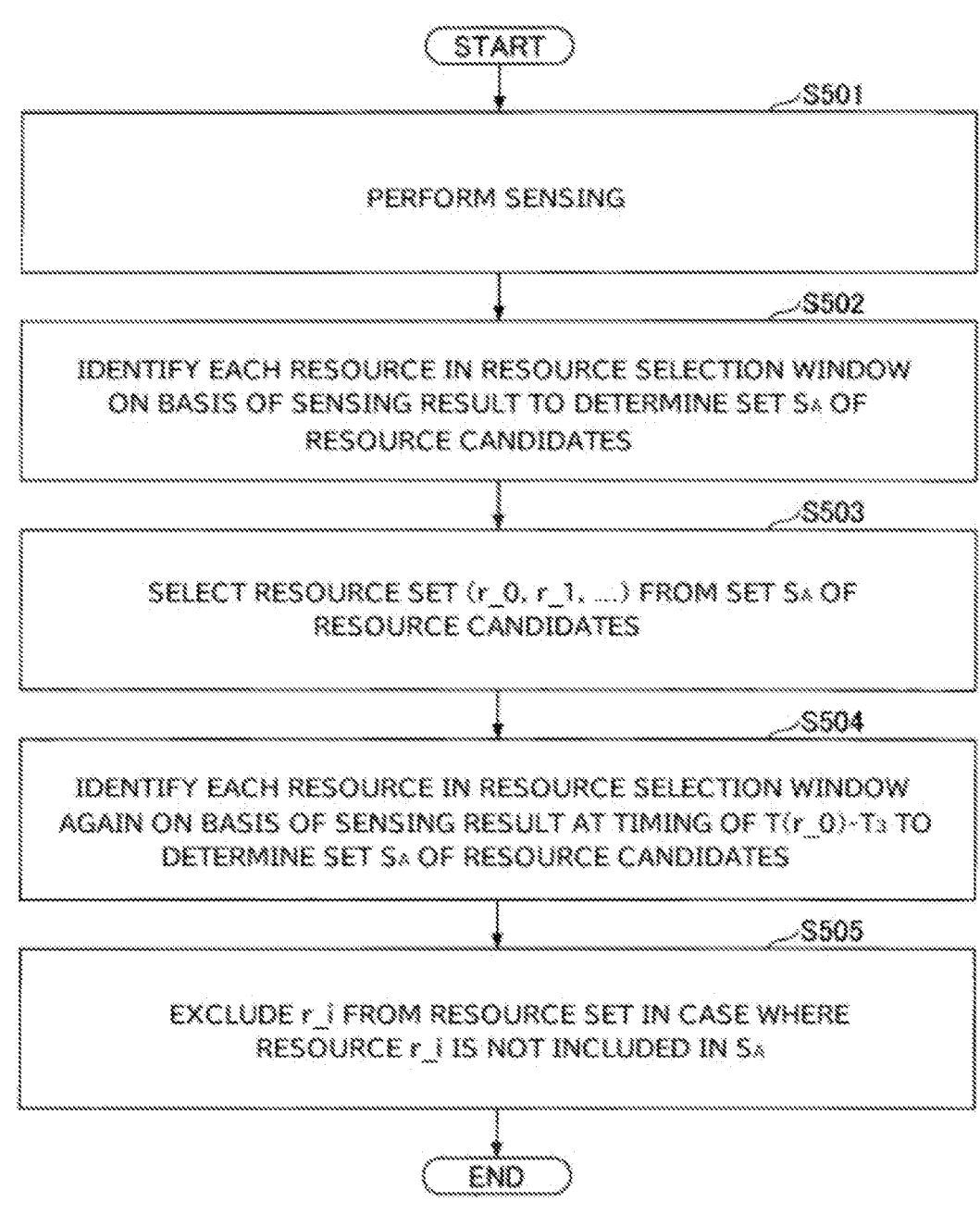

START

S501
PERFORM SENSING

S502
IDENTIFY EACH RESOURCE IN RESOURCE SELECTION WINDOW ON BASIS OF SENSING RESULT TO DETERMINE SET $S_A$ OF RESOURCE CANDIDATES

S503
SELECT RESOURCE SET ($r\_0$, $r\_1$, ...) FROM SET $S_A$ OF RESOURCE CANDIDATES

S504
IDENTIFY EACH RESOURCE IN RESOURCE SELECTION WINDOW AGAIN ON BASIS OF SENSING RESULT AT TIMING OF $T(r\_0) - T_3$ TO DETERMINE SET $S_A$ OF RESOURCE CANDIDATES

S505
EXCLUDE $r\_i$ FROM RESOURCE SET IN CASE WHERE RESOURCE $r\_i$ IS NOT INCLUDED IN $S_A$

END

[FIG. 17]
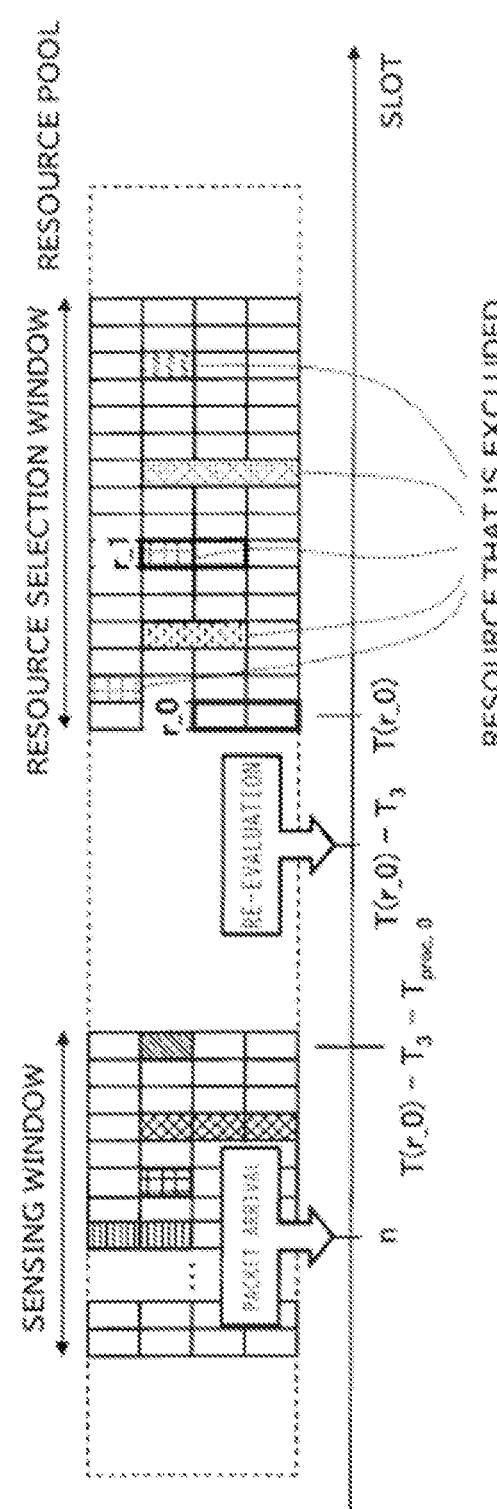

[FIG. 18]

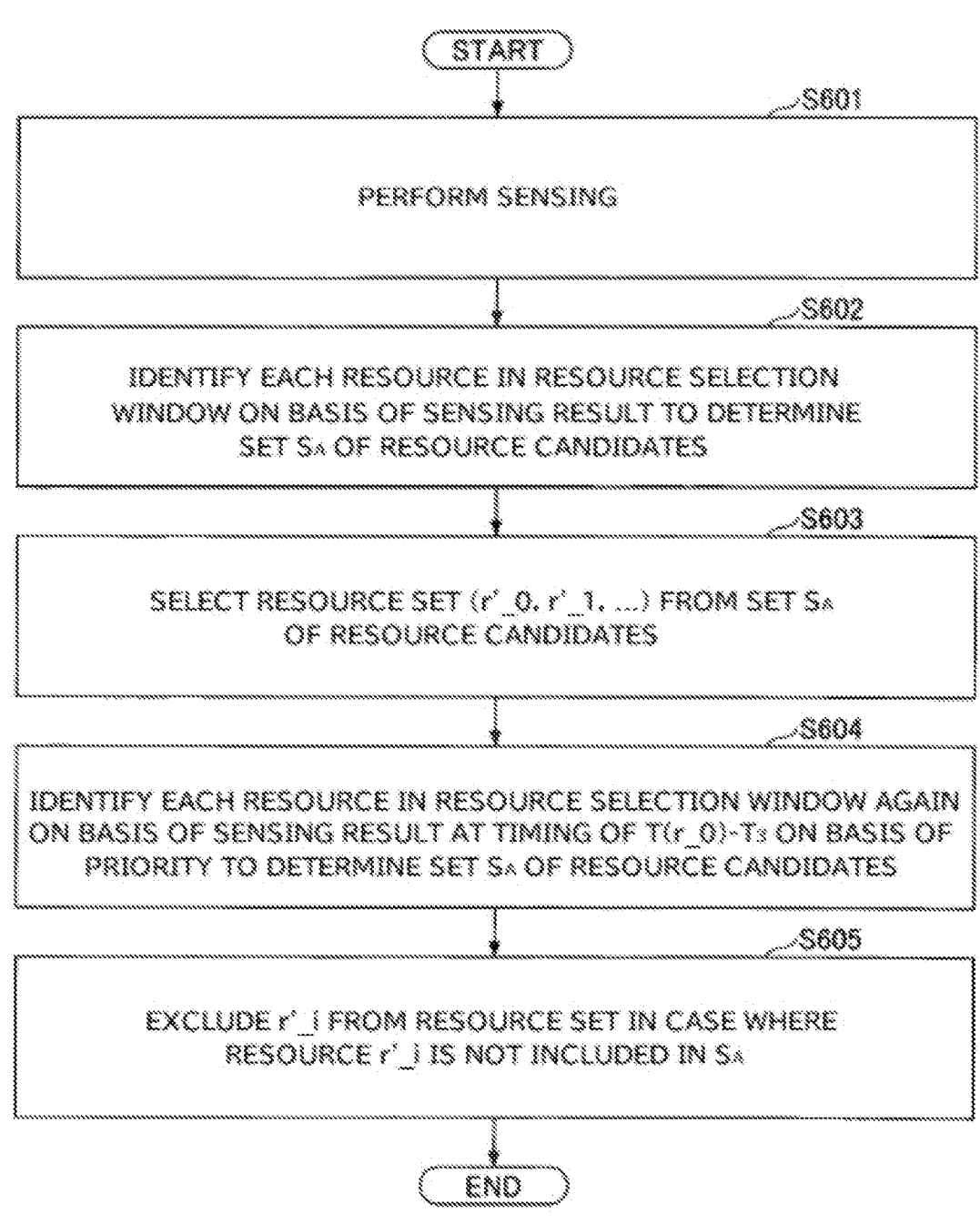

START

S601

PERFORM SENSING

S602

IDENTIFY EACH RESOURCE IN RESOURCE SELECTION
WINDOW ON BASIS OF SENSING RESULT TO DETERMINE
SET $S_A$ OF RESOURCE CANDIDATES

S603

SELECT RESOURCE SET ($r'\_0, r'\_1, ...$) FROM SET $S_A$
OF RESOURCE CANDIDATES

S604

IDENTIFY EACH RESOURCE IN RESOURCE SELECTION WINDOW AGAIN
ON BASIS OF SENSING RESULT AT TIMING OF $T(r\_0)$-$T_3$ ON BASIS OF
PRIORITY TO DETERMINE SET $S_A$ OF RESOURCE CANDIDATES

S605

EXCLUDE $r'\_j$ FROM RESOURCE SET IN CASE WHERE
RESOURCE $r'\_j$ IS NOT INCLUDED IN $S_A$

END

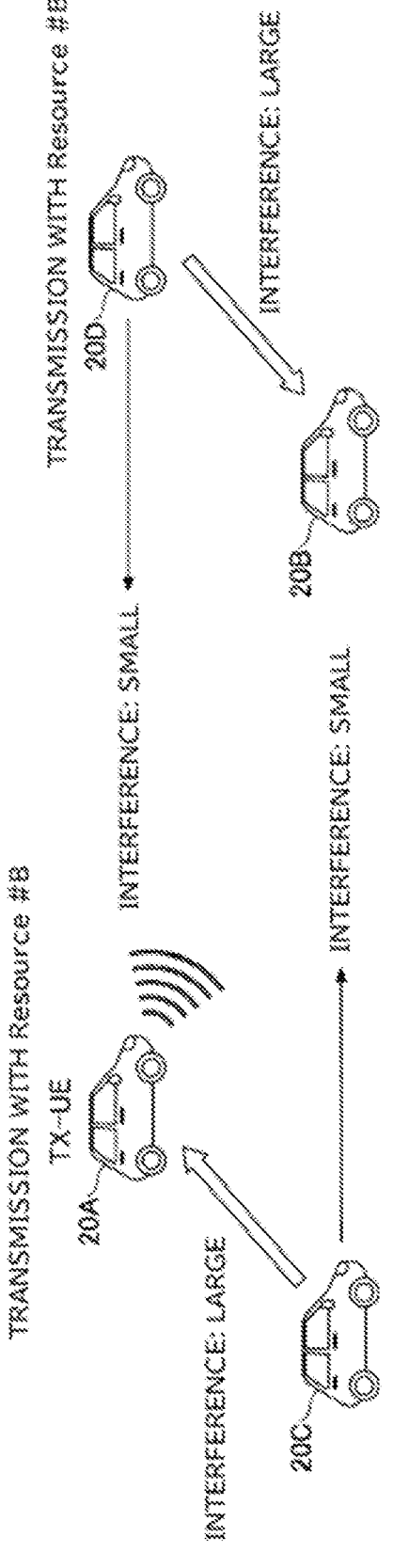
[FIG. 19]

[FIG. 20]
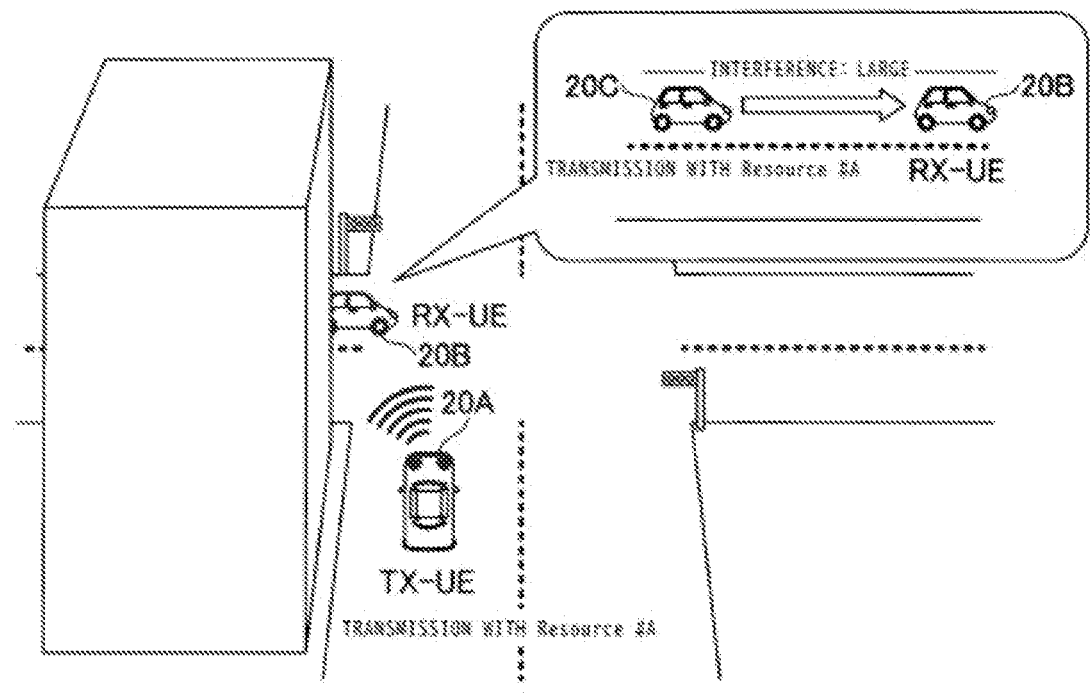
[FIG. 21]
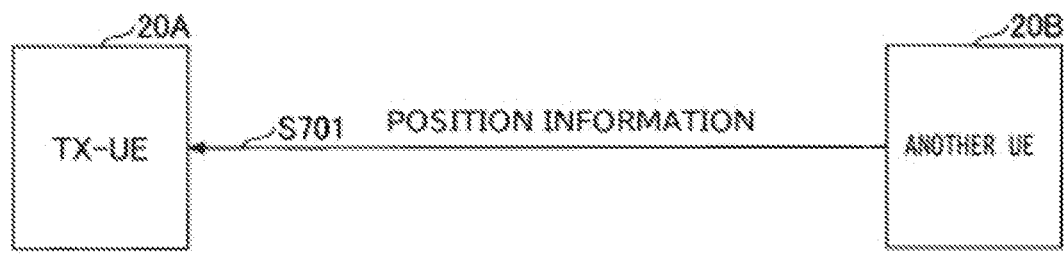

[FIG. 22]
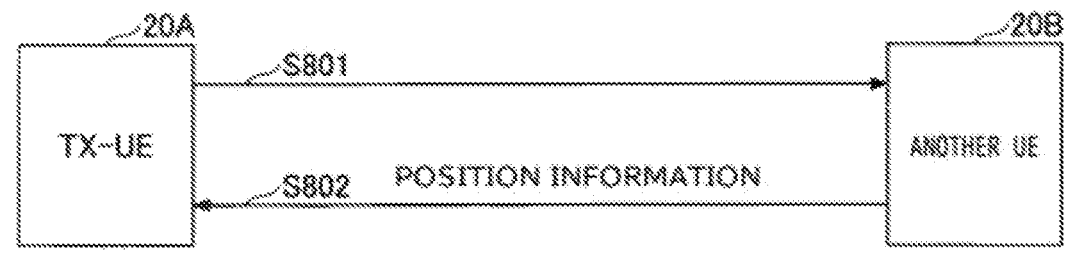
[FIG. 23]
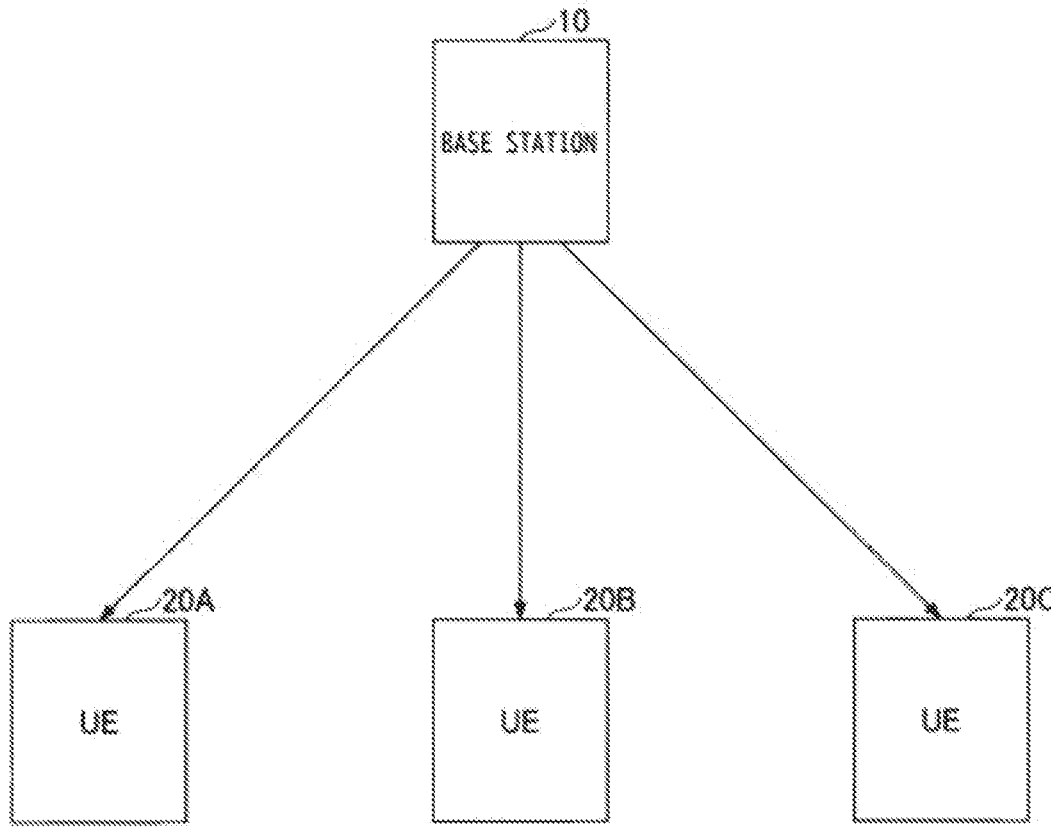

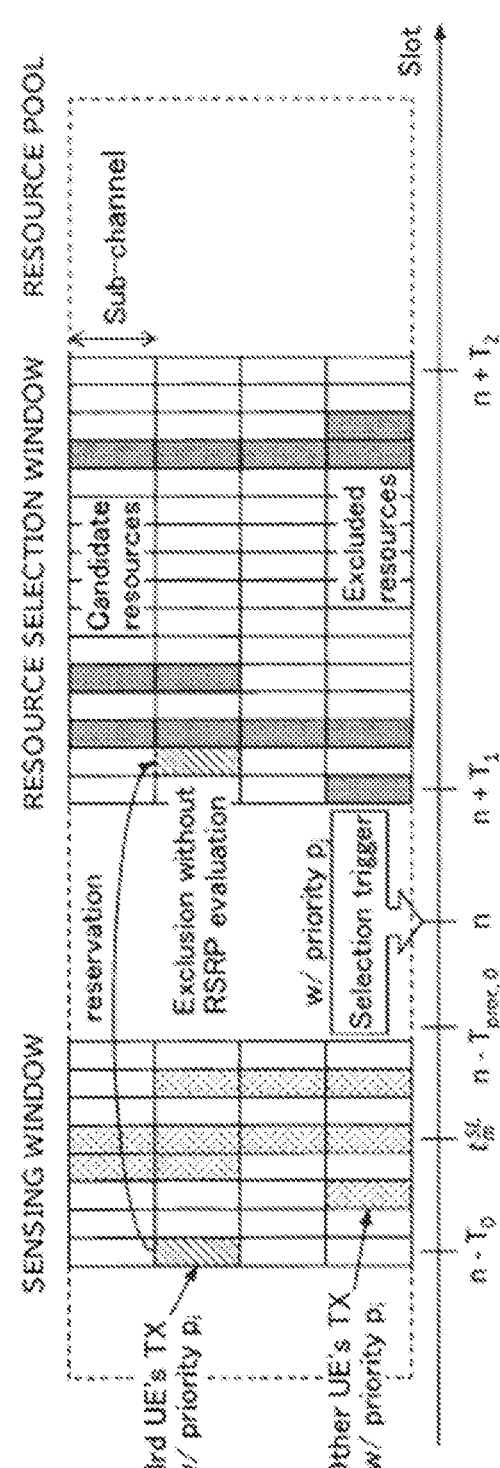
[FIG. 24]

[FIG. 29]
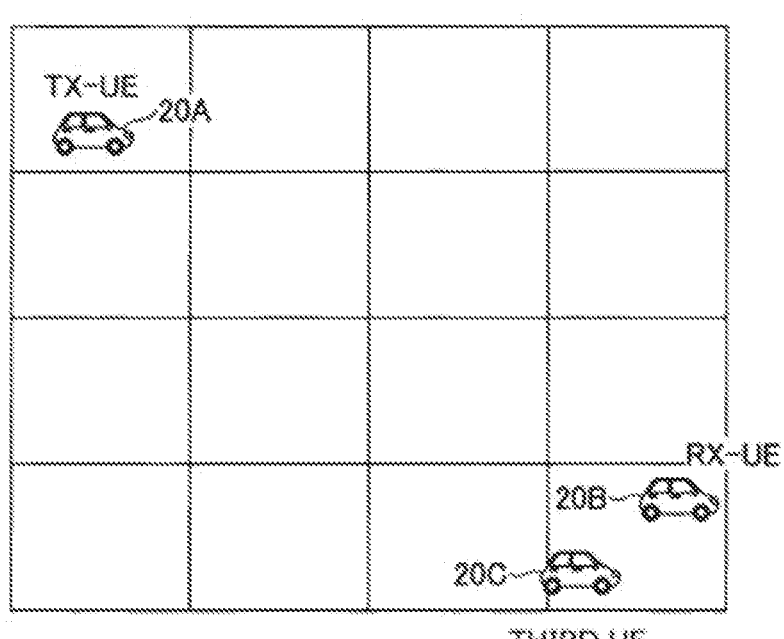

[FIG. 26]
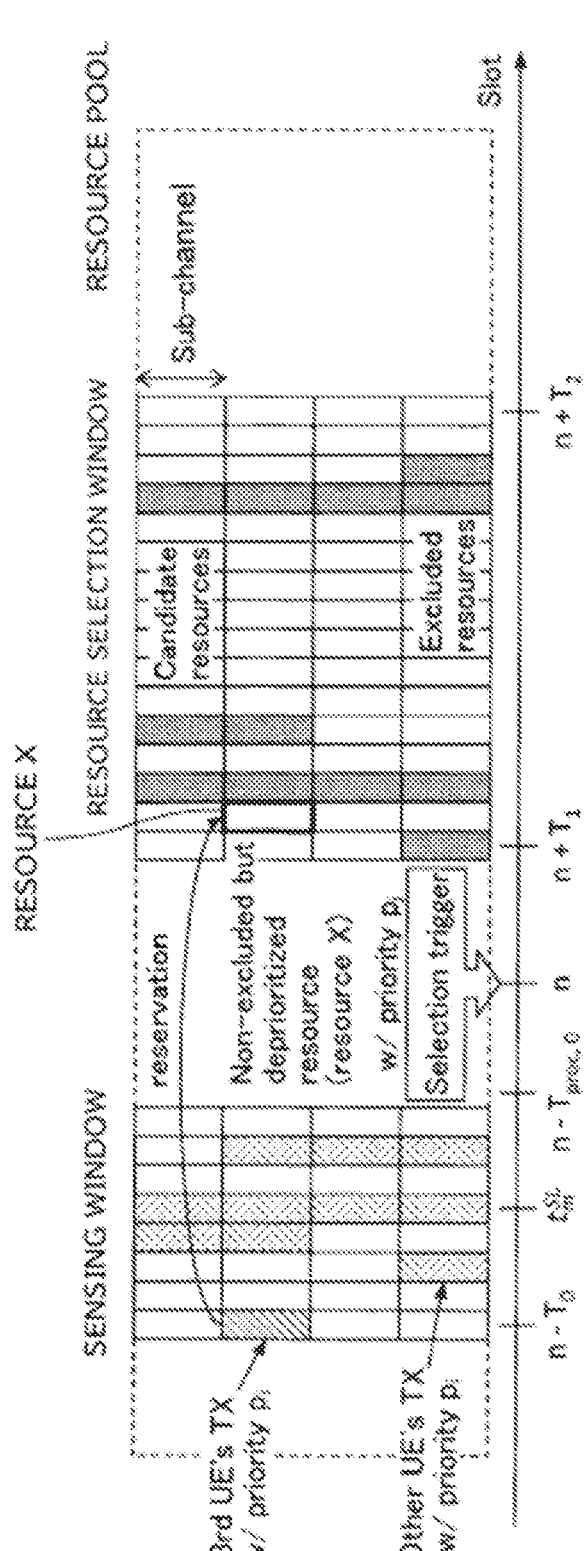

[FIG. 27]
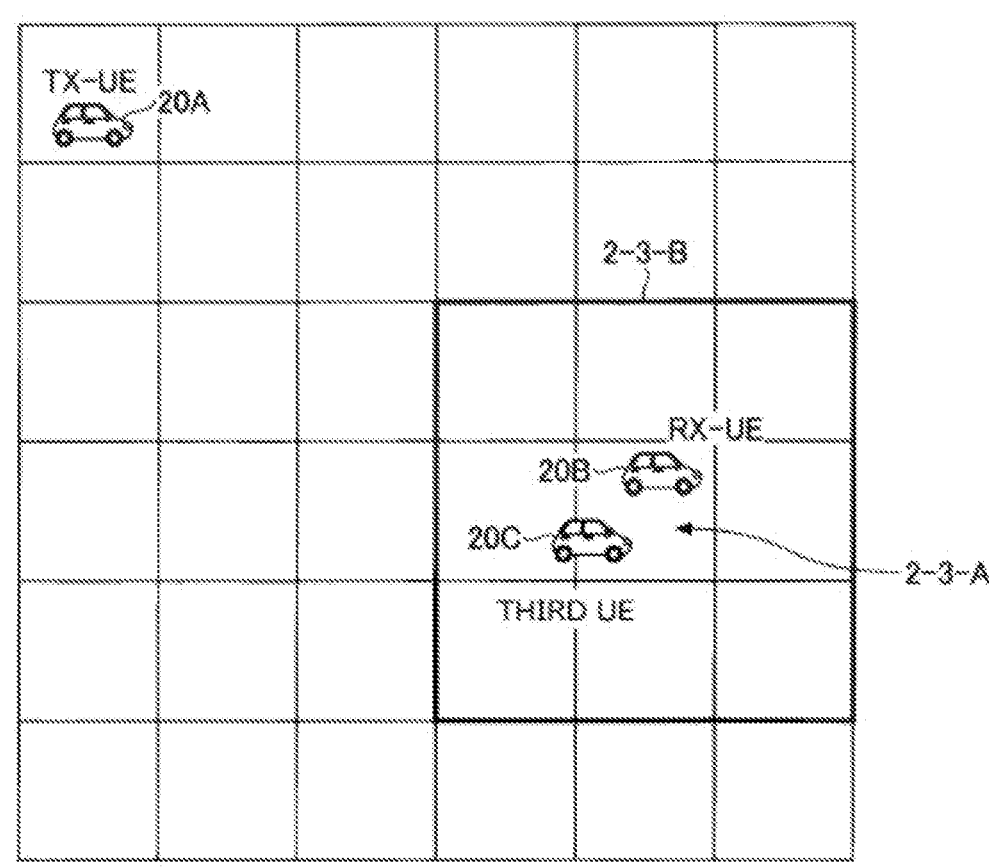

[FIG. 20]
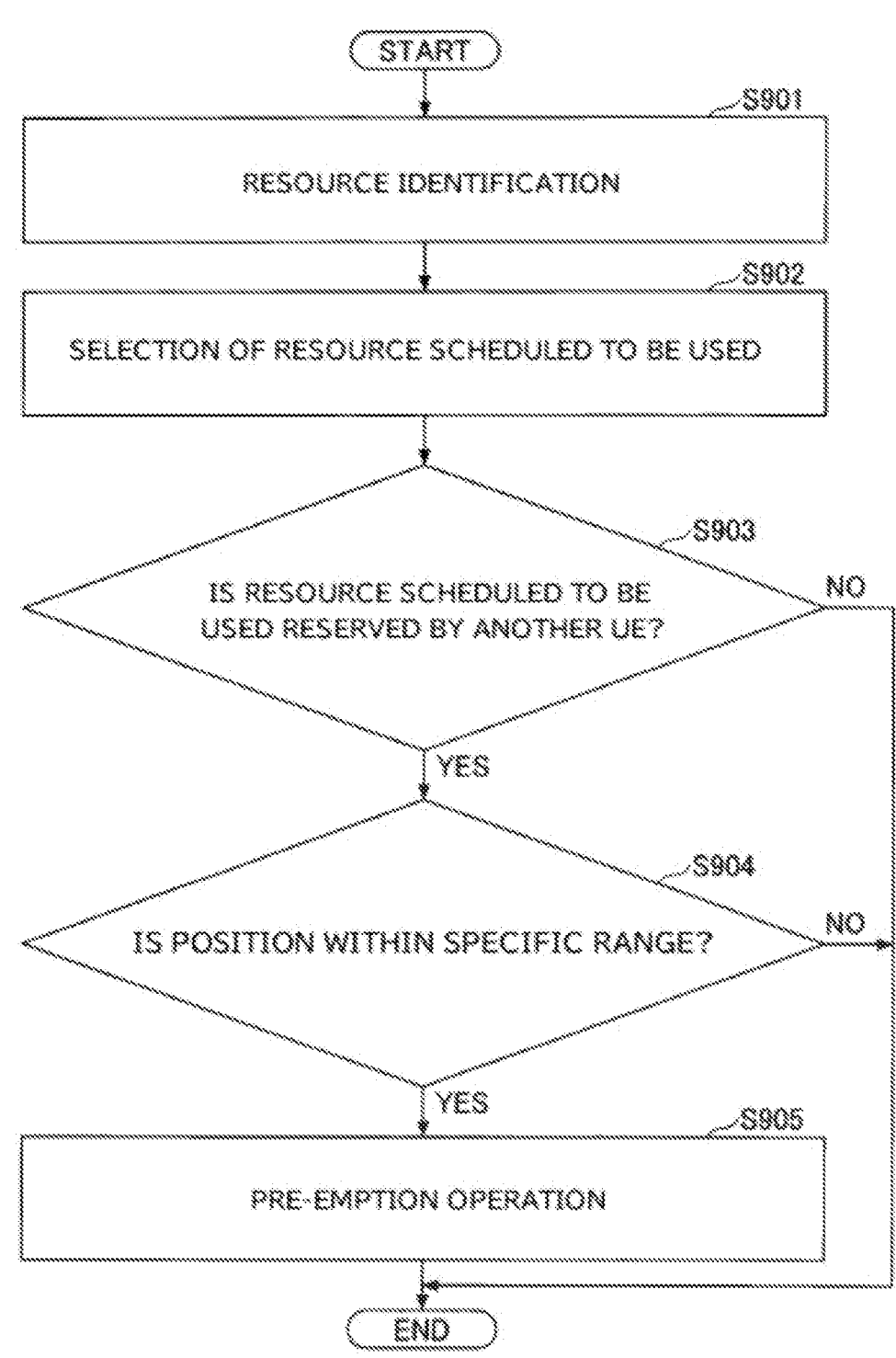

[FIG. 29]
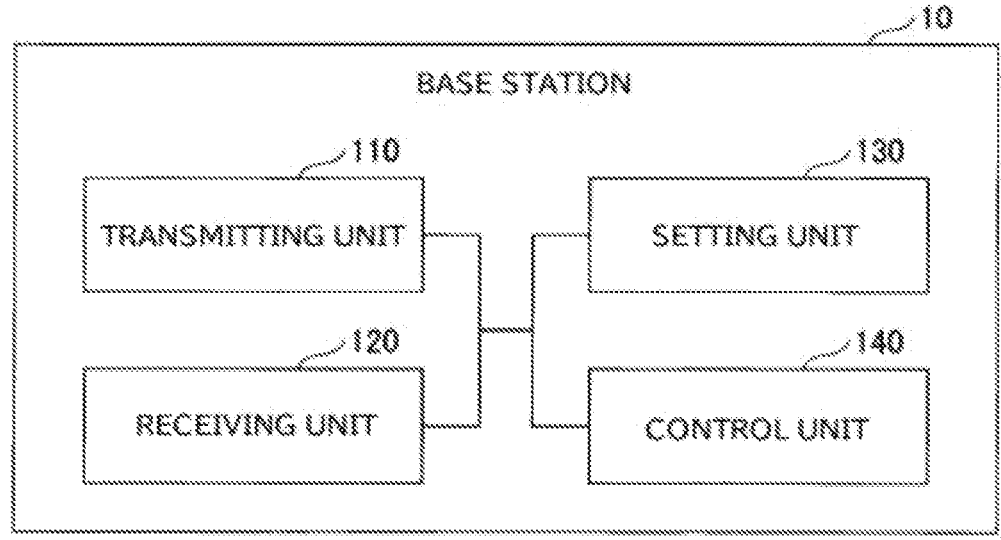
[FIG. 30]
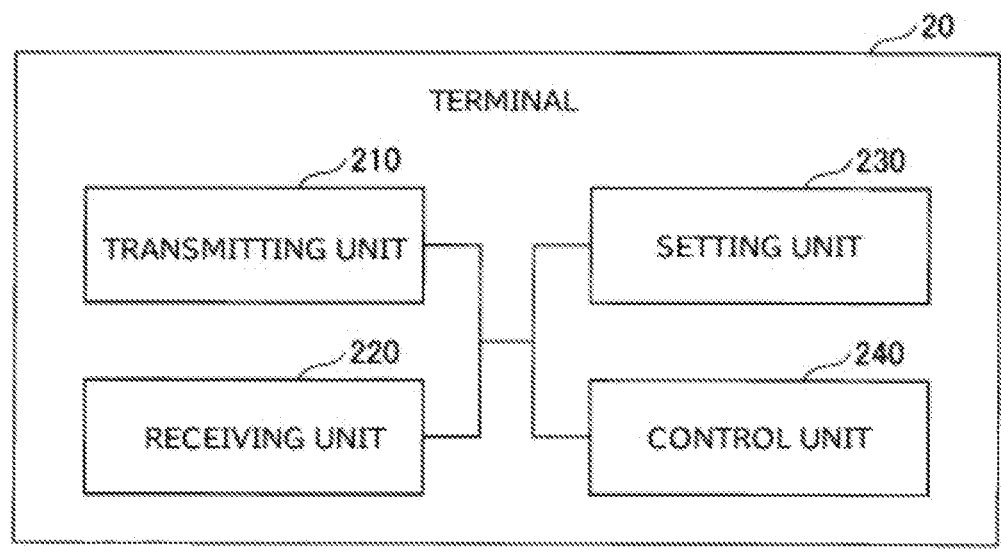

[FIG. 31]
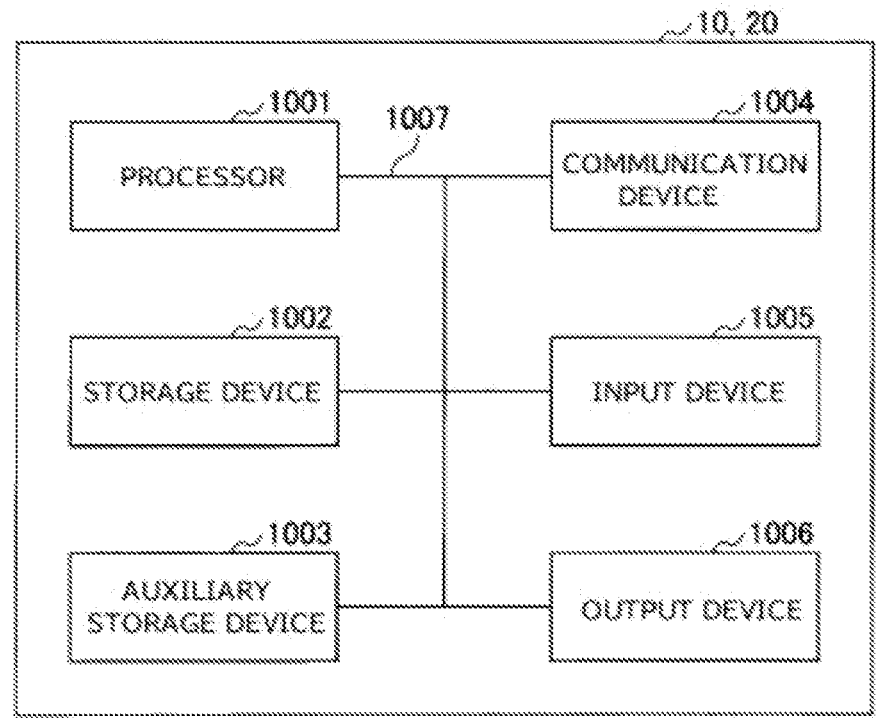

TERMINAL AND RESOURCE CONTROL METHOD

TECHNICAL FIELD

The present invention relates to a terminal in a radio communication system.

BACKGROUND ART

In long term evolution (LTE) and a succeeding system of LTE (for example, LTE advanced system (LTE-A), new radio (NR) (also referred to as 5G)), and the like, a D2D technology in which terminals direct perform communication without through a base station is introduced.

D2D reduces traffic between a terminal and a base station and enables communication between terminals even in a case where the base station enters an uncommunicable state due to a disaster or the like. Note that, in 3rd generation partnership project (3GPP), D2D is referred to as "sidelink", and thus the side link is basically used in this specification.

Sidelink communication is largely classified into discovery for finding other communicable terminal and communication (also referred to as D2D direct communication, inter-terminal direct communication, or the like) for direct communication between terminals. Hereinafter, the communication, the discovery, and the like are simply referred to as the sidelink when not being particularly distinguished. Various use cases of services related to vehicle to everything (V2X) in the NR have been examined.

CITATION LIST

Non-Patent Document

Non-Patent Document 1: 3GPP TS 38.331 V16.1.0 (2020 July)
Non-Patent Document 2: 3GPP TS 38.214 V16.2.0 (2020 June)
Non-Patent Document 3: 3GPP TS 38.321 V16.1.0 (2020 July)

SUMMARY OF THE INVENTION

Problem to be Solved by the Invention

In NR sidelink, in Mode 2 resource allocation mode in which a terminal autonomously selects a resource (Mode 2 resource allocation), a terminal (TX-UE) that performs sidelink transmission selects a transmission resource on the basis of resource reservation information of another terminal acquired by sensing, or the like.

Whether or not quality of a signal transmitted with a resource selected by the TX-UE is actually good (for example, interference is absent or small) depends on a position of a reception terminal (RX-UE) that receives the signal. However, in the related art, since the TX-UE can obtain only information at a position of the TX-UE by sensing, there is a problem that the transmission resource selected by the TX-UE may not be a transmission resource with which the RX-UE can receive a signal with good quality.

The present invention has been made in consideration of such circumstances, and an object thereof is to provide a technology enabling a reception terminal to select a transmission resource in order to receive a signal with good quality in a sidelink.

Means for Solving Problem

According to a technology of the present disclosure, there is provided a terminal including:

a receiving unit that acquires any one or both position information of a reception terminal and position information of a third terminal; and a control unit that performs resource exclusion processing by a specific method with respect to a reserved resource by the third terminal within a specific range from the reception terminal on the basis of the position information acquired by the receiving unit in identification processing of candidates of a transmission resource that is used in a sidelink.

Effect of the Invention

According to the technology of the present disclosure, there is provided a technology enabling a reception terminal to select a transmission resource in order to receive a signal with good quality in a sidelink.

BRIEF DESCRIPTION OF DRAWINGS

FIG. 1 is a view for describing V2X;
FIG. 2 is a view for describing Example (1) of a transmission mode of the V2X;
FIG. 3 is a view for describing Example (2) of the transmission mode of the V2X;
FIG. 4 is a view for describing Example (3) of the transmission mode of the V2X;
FIG. 5 is a view for describing Example (4) of the transmission mode of the V2X;
FIG. 6 is a view for describing Example (5) of the transmission mode of the V2X;
FIG. 7 is a view for describing Example (1) of a communication type of the V2X;
FIG. 8 is a view for describing Example (2) of the communication type of the V2X;
FIG. 9 is a view for describing Example (3) of the communication type of the V2X;
FIG. 10 is a sequence diagram illustrating Operation Example (1) of the V2X;
FIG. 11 is a sequence diagram illustrating Operation Example (2) of the V2X;
FIG. 12 is a sequence diagram illustrating Operation Example (3) of the V2X;
FIG. 13 is a sequence diagram illustrating Operation Example (4) of the V2X;
FIG. 14 is a view illustrating an example of a sensing operation;
FIG. 15 is a view illustrating an example of a partial sensing operation;
FIG. 16 is a flowchart illustrating an example of re-evaluation;
FIG. 17 is a view illustrating an example of the re-evaluation;
FIG. 18 is a flowchart illustrating an example of pre-emption;
FIG. 19 is a view for describing a problem;
FIG. 20 is a view for describing a problem;
FIG. 21 is a view for describing Example 1;
FIG. 22 is a view for describing Example 1;
FIG. 23 is a view for describing Example 1;
FIG. 24 is a view for describing Example 2-1;
FIG. 25 is a view for describing Example 2-1;
FIG. 26 is a view for describing Example 2-2;

FIG. 27 is a view for describing Example 2-3;

FIG. 28 is a flowchart for describing Example 2-4;

FIG. 29 is a view illustrating an example of a functional configuration of a base station 10 in an embodiment of the invention;

FIG. 30 is a view illustrating an example of a functional configuration of a terminal 20 in the embodiment of the invention; and FIG. 31 is a view illustrating an example of a hardware configuration of the base station 10 or the terminal 20 in the embodiment of the invention.

MODE(S) FOR CARRYING OUT THE INVENTION

Hereinafter, embodiments of the invention will be described with reference to the accompanying drawings. Note that, the following embodiments are illustrative only, and embodiments to which the invention is applied are not limited to the following embodiments.

In an operation of a radio communication system of an embodiment of the invention, an existing technology is appropriately used. However, the existing technology is, for example, an existing NR (for example, technologies disclosed in Non-Patent Documents 1 to 3) or existing LET, but there is no limitation to the existing NR or the existing LTE. In addition, it is assumed that a terminology "LTE" used in this specification has broad meaning including LTE-Advanced, a scheme (for example, NR) succeeding to LTE-Advanced, or radio local area network (LAN) unless otherwise stated.

In addition, in an embodiment of the invention, a duplex scheme may be a time division duplex (TDD) scheme, a frequency division duplex (FDD) scheme, or other schemes (for example, flexible duplex, and the like).

In addition, in the embodiment of the invention, with regard to description of "a radio parameter or the like is configured", a predetermined value may be pre-configured, or may be configured on the basis of a radio parameter given in notification from a base station 10 or a terminal 20.

In the following description, as an example, an operation of a higher layer (for example, an MAC layer) and a lower layer (for example, a PHY layer) in a terminal will be described. However, functional division of the higher layer and the lower layer is illustrative only, and an operation described below may be performed without division between the higher layer and the lower layer.

FIG. 1 is a view for describing V2X. In 3GPP, an examination has been made to realize vehicle to everything (V2X) or enhance V2X (eV2X) by extending a D2D function, and specifications are in progress. As illustrated in FIG. 1, the V2X is a part of intelligent transport systems (ITS), and is a general term of vehicle to vehicle (V2V) that represents a communication type performed between vehicles, vehicle to infrastructure (V2I) that represents a communication type performed between a vehicle and a road-side unit provided in a road side, a vehicle to network (V2N) that represents a communication type performed between a vehicle and an ITS server, and vehicle to pedestrian (V2P) that represents a communication type performed between a vehicle and a mobile terminal carried by a pedestrian.

In addition, in 3GPP, V2X that uses cellular communication or inter-terminal communication of LTE or NR has been examined. The V2X that uses the cellular communication is also referred to as cellular V2X. In the V2X of the NR, an examination for realizing an increase in capacity, a reduction in delay, high reliability, and quality of server (QoS) control is in progress.

With regard to the LTE and the V2X of the NR, it is assumed that an examination that is not limited to 3GPP specification in the future is also in progress. For example, it is assumed that securement of interoperability, a reduction in the cost by implementing a higher layer, a combination or switching method of a plurality of radio access technologies (RAT), regulation support in each country, data acquisition, distribution, database management, and a use method of a V2X platform of the LTE or the NR are examined.

In the embodiment of the invention, an aspect in which a communication device (may also be referred to as a terminal) is mounted in a vehicle is mainly assumed, but the embodiment of the invention is not limited to the aspect. For example, the communication device may be a terminal carried by human beings, the communication device may be a device that is mounted in a drone or an airplane, or the communication device may be a base station, an RSU, a relay station (relay node), a terminal having scheduling capability, or the like. Here, a vehicle in which the communication device is mounted may be referred to as a terminal.

Note that, sidelink (SL) may be distinguished on the basis of uplink (UL) or downlink (DL), and any or combination of 1) to 4) to be described below. In addition, the SL may be another name.

1) Time domain resource arrangement
2) Frequency domain resource arrangement
3) Synchronization signal that is referenced (including sidelink synchronization signal (SLSS))
4) Reference signal that is used in path loss measurement for transmission power control In addition, with regard to orthogonal frequency division multiplexing (OFDM) of the SL or the UL, any of cyclic prefix OFDM (CP-OFDM), discrete Fourier transform-spread-OFDM (DFT-S-OFDM), OFDM that is not subjected to transform precoding, and OFDM that is subjected to transform precoding may be applied.

In the SL of the LTE, with regard to resource allocation of the SL to a terminal 20, Mode 3 and Mode 4 are defined. In Mode 3, a transmission resource can be dynamically allocated by downlink control information (DCI) that is transmitted from the base station 10 to the terminal 20. In addition, in Mode 3, semi persistent scheduling (SPS) is also possible. In Mode 4, the terminal 20 autonomously select a transmission resource from a resource pool.

Note that, a slot in the embodiment of the invention may be read to as a symbol, a mini slot, a subframe, a radio frame, or a transmission time interval (TTI). In addition, a cell in the embodiment of the invention may be read as a cell group, a carrier component, a BWP, a resource pool, a resource, a radio access technology (RAT), a system (including wireless LAN), or the like.

In the embodiment of the invention, the terminal 20 may be all kinds of terminals which perform D2D communication without limitation to the V2X terminal. For example, the terminal 20 may be a terminal such as a smartphone carried by a user, or an internet of things (IOT) device such as a smart meter. In addition, the terminal may be referred to as "UE".

Basic Configuration Example and Basic Operation Example of System

FIG. 2 to FIG. 13 to be described below illustrate an example of a system configuration in this embodiment, and illustrates an example of a basic operation in a system according to this embodiment.

As illustrated in FIG. 2, a radio communication system according to this embodiment includes a terminal 20A, a terminal 20B, and a base station 10. Note that, actually a plurality of terminals exist, but FIG. 2 illustrates the terminal 20A and the terminal 20b as an example.

Hereinafter, the terminal 20A and the terminal 20B will be simply noted as "terminal 20" or "UE" when not being particularly distinguished. As an example, FIG. 2 illustrates a case where the terminal 20A and the terminal 20B are in a coverage of a cell in combination, but an operation in this embodiment is also applicable to a case where the terminal 20 is out of the coverage.

Note that, it is not necessary for the terminal 20 to be a one casing device, and for example, even in a case where various sensors are dispersed and disposed in a vehicle, a device including the various sensors may be the terminal 20.

In addition, processing contents of transmission data of a sidelink of the terminal 20 is basically similar to processing contents of UL transmission in the LTE or the NR. For example, the terminal 20 may scramble and modulate code words of transmission data to generates complex-valued symbols, may map the complex-valued symbols (transmission signal) to one or two layers, and may perform precoding. Then, the terminal 20 performs mapping to a resource element, generates a transmission signal (for example: complex-valued time-domain SC-FDMA signal), and transmits the transmission signal from each antenna port.

The base station 10 has a cellular communication function as a base station in the LTE or the NR, and a function enabling communication of the terminal 20 in this embodiment (for example, a resource pooling setup, resource allocation, or the like). In addition, the base station 10 may be RSU (gNB type RSU). The base station 10 is a communication device that provides one or more cells, and performs radio communication with the terminal 20. A physical resource of a radio signal is defined by a time domain and a frequency domain, the time domain may be defined by the number of OFDM symbols, and the frequency domain may be defined by the number of sub-carriers and the number of resource blocks. In addition, a transmission time interval (TTI) in the time domain may be a slot, and the TTI may be a subframe.

In addition, in the radio communication system according to this embodiment, a signal waveform that is used in the SL or the UL by the terminal 20 may be OFDMA, SC-FDMA, or other signal waveforms.

In the example illustrated in FIG. 2, the terminal 20A on a transmission side may be referred to as "TX-UE", and the terminal 20B on a reception side may be referred to as "RX-UE".

FIG. 2 is a view for describing an operation example in Example (1) in a transmission mode of the V2X. In the communication mode of a sidelink illustrated in FIG. 2, in Step 1, the base station 10 transmits scheduling information of the sidelink to the terminal 20A. Next, the terminal 20A transmits control information with a physical sidelink control channel (PSCCH) on the basis of the received scheduling information, and transmits data (may be control information) to the terminal 20B with a physical side link shared channel (PSSCH) (Step 2). Note that, transmission of the control information with the PSCCH may be noted as "PSCCH is transmitted", and transmission of data (may be control information) with the PSSCH may be noted as "PSSCH is transmitted".

The transmission mode of the sidelink communication illustrated in FIG. 2 may be referred to as Sidelink Transmission Mode 3 in the LTE. In Sidelink Transmission Mode 3 in the LET, Uu-based sidelink scheduling is performed. Uu a wireless interface between universal terrestrial radio access network (UTRAN) and a user equipment (UE). Note that, the transmission mode of the sidelink communication illustrated in FIG. 2 may be referred to as Sidelink Transmission Mode 1 in the NR.

FIG. 3 is a view for describing an operation example in Example (2) of the transmission mode of the V2X. In the transmission mode of the sidelink communication illustrated in FIG. 3, in Step 1, the terminal 20A transmits the PSCCH and the PSSCH to the terminal 20B by using an autonomously selected resource. The transmission mode of the sidelink communication illustrated in FIG. 3 may be referred to Sidelink transmission mode 4 in the LTE. In Sidelink Transmission mode 4 in the LTE, the terminal 20A performs resource selection.

FIG. 4 is a view for describing an operation example in Example (3) of the transmission mode of the V2X. In the transmission mode of the sidelink communication illustrated in FIG. 4, in Step 1, the terminal 20A transmits the PSCCH and the PSSCH to the terminal 20B by using an autonomously selected resource. Similarly, the terminal 20B transmits the PSCCH and the PSSCH to the terminal 20A by using the autonomously selected resource (Step 1). The transmission mode of the sidelink communication illustrated in FIG. 4 may be referred to as Sidelink Transmission Mode 2 or Transmission Mode 2a in the NR. In Sidelink Transmission Mode 2 in the NR, the terminal 20 performs resource selection.

FIG. 5 is a view for describing an operation example in Example (4) of the transmission mode of the V2X. In the transmission mode of the sidelink communication illustrated in FIG. 5, in step 0, the base station 10 transmits a resource pattern of the sidelink to the terminal 20A through radio resource control (RRC) configuration. Next, the terminal 20A transmits the PSSCH to the terminal 20B on the basis of configuration of received grant (resource pattern) (Step 1). The transmission mode of the sidelink communication illustrated in FIG. 5 may be referred to as Sidelink Transmission Mode 2c in the NR.

FIG. 6 is a view for describing an operation example in Example (5) of the transmission mode of the V2X. In the transmission mode of the sidelink communication illustrated in FIG. 6, in Step 1, the terminal 20A transmits scheduling information of the sidelink to the terminal 20B with the PSCCH. Next, the terminal 20B transmits the PSSCH to the terminal 20A on the basis of the received scheduling information (Step 2). The transmission mode of the sidelink communication illustrated in FIG. 6 may be referred to as Sidelink Transmission Mode 2d in the NR.

FIG. 7 is a view for describing an operation example in Example (1) of a communication type of the V2X. The communication type of the sidelink illustrated in FIG. 7 is unicast. The terminal 20A transmits the PSCCH and the PSSCH to the terminal 20. In the example illustrated in FIG. 7, the terminal 20A performs unicast to the terminal 20B, and performs unicast to a terminal 20C.

FIG. 8 is a view for describing an operation example in Example (2) of the communication type of the V2X. The communication type of the sidelink illustrated in FIG. 8 is group cast. The terminal 20A transmits the PSCCH and the PSSCH to one a group to which one or a plurality of the terminals 20 pertain. In the example illustrated in FIG. 8, the group includes the terminal 20B and the terminal 20C, and the terminal 20A perform group cast to the group.

FIG. 9 is a view for describing an operation example in Example (3) of the communication type of the V2X. The communication type of the sidelink illustrated in FIG. 9 is broadcast. The terminal 20A transmits the PSCCH and the PSSCH to one or a plurality of the terminals 20. In the example illustrated in FIG. 9, the terminal 20A performs broadcast to the terminal 20B, the terminal 20C, and a terminal 20D. Note that, the terminal 20A illustrated in FIG. 7 to FIG. 9 may be referred to as a header UE.

In addition, in NR-V2X, hybrid automatic repeat request (HARQ) is supported for the unicast and the groupcast of the sidelink. In addition, in the NR-V2X, sidelink feedback control information (SFCI) including an HARQ response is defined. The SFCI is transmitted with a physical sidelink feedback channel (PSFCH).

Note that, in the following description, it is assumed that the PSFCH is used in the transmission of the HARQ-ACK in the sidelink, but this is illustrative only. For example, transmission of HARQ-ACK in the sidelink may be performed by using the PSCCH, transmission of the HARQ-ACK in the sidelink may be performed by using the PSSCH, or transmission of the HARQ-ACK in the sidelink may be performed by using other channels.

Hereinafter, for convenience, all pieces of information reported by the terminal 20 in the HARQ are referred to as HARQ-ACK. The HARQ-ACK may be referred to as HARQ-ACK information. In addition, more specifically, a codebook applied to the HARQ-ACK information reported from the terminal 20 to the base station 10 or the like is referred to as an HARQ-ACK codebook. The HARQ-ACK codebook defines a bit stream of the HARQ-ACK information. Note that, NACK other than ACK is also transmitted by the "HARQ-ACK".

FIG. 10 is a sequence diagram illustrating Operation Example (1) relating to the HARQ-ACK of the V2X.

In Step 101, the terminal 20A autonomously selects a resource that is used in the PSCCH and the PSSCH with a resource selection window having a predetermined period. The resource selection window may be configured from the base station 10 to the terminal 20. Note that, in the resource selection, resource identification processing of determining a set of candidates and resource selection processing of selecting a resource from the set are performed, but a detailed example thereof will be described later.

In step S102 and step S103, the terminal 20A transmits sidelink control information (SCI) with the PSCCH (or the PSSCH) and transmits SL data with the PSSCH by using the resource that is autonomously selected in step S101. For example, the terminal 20A may transmit the PSCCH with the same time resource as at least a part of a time resource of the PSSCH by using a frequency resource adjacent to a frequency resource of the PSSCH.

The terminal 20B receives the SCI (PSCCH or PSSCH) and the SL data (PSSCH) transmitted from the terminal 20A. Resource information of the PSFCH for transmitting the HARQ-ACK with respect to reception of the data by the terminal 20B may be included in the received SCI. The terminal 20A may transmit information of the autonomously selected resource (resource reservation information) in a state of being included in the SCI.

In step S104, the terminal 20B transmits HARQ-ACK with respect to received data to the terminal 20A by using the resource of the PSFCH that is determined from the received SCI.

In step S105, in a case where the HARQ-ACK received in step S104 indicates request for retransmission, that is, in a case of NACK (negative response), the terminal 20A retransmits the PSCCH and the PSSCH to the terminal 20B. The terminal 20A may retransmit the PSCCH and the PSSCH by using the autonomously selected resource.

Note that, in a case where the HARQ feedback control is not performed, step S104 and step S105 may not be performed.

FIG. 11 is a sequence diagram illustrating Operation Example (2) relating to the HARQ-ACK of the V2X. Blind retransmission without HARQ feedback control may be performed to improve a transmission succession rate or a reaching distance.

In step S201, the terminal 20A autonomously selects a resource that is used in the PSCCH and the PSSCH with a resource selection window having a predetermined period. The resource selection window may be configured from the base station 10 to the terminal 20.

In step S202 and step S203, the terminal 20A transmits SCI with the PSCCH (or PSSCH) and transmits SL data with the PSSCH by using the resource that is autonomously selected in step S201. For example, the terminal 20A may transmit the PSCCH with the same time resource as at least a part of a time resource of the PSSCH by using a frequency resource adjacent to a frequency resource of the PSSCH.

In step S204, the terminal 20A retransmits the SCI with the PSCCH or the PSSCH and the SL data with the PSSCH to the terminal 20B by using the resource that is autonomously selected in step S201. The retransmission in step S204 may be performed a plurality of times.

Note that, in a case where the blind retransmission is not performed, step S204 may not be performed.

FIG. 12 is a sequence diagram illustrating Operation Example 3 relating to the HARQ-ACK of the V2X. The base station 10 may perform scheduling of a sidelink. That is, the base station 10 may determine a resource of a sidelink that is used by the terminal 20, and may transmit information indicating the resource to the terminal 20. In addition, in a case where HARQ control is applied, the base station 10 may transmit information indicating a resource of the PSFCH to the terminal 20.

In step S301, the base station 10 performs SL scheduling by transmitting downlink control information (DCI) to the terminal 20A with the PDCCH. For convenience, the DCI for the SL scheduling is referred to as SL scheduling DCI.

In addition, in step S301, the base station 10 may transmit DCI for DL scheduling (may be referred to as DL allocation) to the terminal 20A with the PDCCH. For convenience, the DCI for the DL scheduling is referred to as DL scheduling DCI. The terminal 20A received the DL scheduling DCI receives DL data with the PDSCH by using a resource that is designated with the DL scheduling DCI.

In step S302 and step S303, the terminal 20A transmits sidelink control information (SCI) with the PSCCH (or PSSCH) and transmits SL data with the PSSCH by using the resource designated with the SL scheduling DCI. Note that, in the SL scheduling DCI, it may be assumed that only a resource of the PSSCH is designated. In this case, for example, the terminal 20A may transmit the PSCCH with the same time resource as at least a part of a time resource of the PSSCH by using a frequency resource adjacent to a frequency resource of the PSSCH.

The terminal 20B receives the SCI and the SL data (PSSCH) transmitted from the terminal 20A. Resource information of the PSFCH for transmitting the HARQ-ACK with respect to reception of the data by the terminal 20B may be included in the SCI received with the PSCCH or the PSSCH.

The resource information may be included in the DL scheduling DCI or the SL scheduling DCI that is transmitted from the base station 10 in step S301, or the terminal 20A may acquire the resource information from the DL scheduling DCI or the SL scheduling DCI to be included in the SCI. Alternatively, it may be assumed that the resource information is not included in the DCI transmitted from the base station 10, and the terminal 20A may autonomously transmit the resource information in a state of being included in the SCI.

In step S304, the terminal 20B transmits the HARQ-ACK with respect to the received data to the terminal 20A by using the resource of the PSFCH that is determined from the received SCI.

In step S305, for example, at timing (for example, timing in a slot unit) designated by the DL scheduling DCI (or the SL scheduling DCI), the terminal 20A transmits the HARQ-ACK by using a physical uplink control channel (PUCCH) resource designated by the DL scheduling DCI (or the SL scheduling DCI), and the base station 10 receives the HARQ-ACK.

Note that, in a case where HARQ feedback control is not performed, at least one of step S304 and step S305 may not be performed.

FIG. 13 is a sequence diagram illustrating Operation Example (4) relating to the HARQ-ACK of the V2X. As described above, in the sidelink of the NR, an HARQ response is supported to be transmitted with the PSFCH. Note that, as a format of the PSFCH, for example, the same format as a physical uplink control channel (PUCCH) format can be used. That is, in the format of the PSFCH, a physical resource block (PRB) size may be 1, and ACK and NACK may be a sequence-based format that is identified by a difference of a sequence or a cyclic shift (or both of these). The format of the PSFCH is not limited thereto. A resource of the PSFCH may be disposed in a symbol at the end of a slot or a plurality of symbols at the end of the slot. In addition, whether a cycle N is to be set to the PSFCH resource is defined in advance. Whether the cycle N is set in a slot unit may be defined in advance.

In FIG. 13, the vertical axis represents a frequency domain, and the horizontal axis represents a time domain. The PSCCH may be disposed in one symbol at the head of the slot, or may be disposed in a plurality of symbols from the head, or may be disposed in a plurality of symbols from a symbol other than the head. The PSFCH may be disposed in one symbol at the end of a slot or may be disposed in a plurality of symbols at the end of the slot. Note that, when symbols which are available to the side link among a plurality of symbols constituting one slot are set as X symbols, "slot head" may represent the head symbol, or may represent a head symbol among symbols except for the head symbol of the X symbols. Similarly, "slot end" may represent the end symbol of the X symbols, or an end symbol among symbols except for the end symbol of the X symbols. In the example illustrated in FIG. 13, three subchannels are set in a resource pool, and two PSFCHs are disposed after three slots from a slot in which the PSSCH is disposed. An arrow from the PSSCH to the PSFCH represents an example of the PSFCH that is associated with the PSSCH.

FIG. 13 illustrates an example of Groupcast Option 2 in which an HARQ response in groupcast of the NR-V2X transmits ACK or NACK. As illustrated in FIG. 13, in step S401, the terminal 20A that is a transmission side terminal

20 performs groupcast to the terminal 20B, the terminal 20C, and the terminal 20D which are reception side terminals 20 through an SL-SCH. In the subsequent step S402, the terminal 20B uses a PSFCH #B, the terminal 20C uses a PSFCH #C, and the terminal 20D uses a PSFCH #D in order to transmit the HARQ response to the terminal 20A. Note that, in Groupcast Option 1, only NACK is transmitted as the HARQ response, and ACK is not transmitted.

FIG. 14 is a view illustrating an example of a sensing operation as a basic operation example of a system in this embodiment. Here, as an example, an example of a sensing operation in the LTE is illustrated. In a case where partial sensing is not set from a higher layer in an LTE sidelink, as illustrated in FIG. 14, the terminal 20 performs transmission by selecting a resource. As illustrated in FIG. 14, the terminal 20 performs sensing in a sensing window in a resource pool. Due to the sensing, the terminal 20 receives a resource reservation field included in SCI transmitted from another terminal 20, and identifies an available resource candidate in the resource selection window in the resource pool on the basis of the field. Next, the terminal 20 randomly selects a resource as an available resource candidate. Sensing of total resources in the sensing window may be referred to as full sensing.

In addition, as illustrated in FIG. 14, resource pool setting may have a cycle. For example, the cycle may be a period of 10240 milliseconds. FIG. 14 is an example in which from a subframe $t_0^{SL}$ to a subframe $t_{Tmax}^{SL}$ are set as a resource pool. In the resource pool in the cycle, for example, a region may be set by a bit map.

In addition, as illustrated in FIG. 14, it is assumed that a transmission trigger in the terminal 20 occurs in a subframe, and priority of the transmission is $p_{TX}$. In a sensing window from a subframe $t_{n-10 \times Pstep}^{SL}$ to a subframe $t_{n-1}^{SL}$, for example, the terminal 20 can detect that another terminal 20 has performed transmission in the priority $p_{RX}$. In a case where the SCI is detected in the sensing window, and RSRP is greater than a threshold value, a resource in a resource selection window corresponding to the SCI is excluded. In addition, in a case where the SCI is detected in the sensing window, and RSRP is less than the threshold value, a resource in a resource selection window corresponding to the SCI is not excluded. For example, the threshold value may be priority $p_{RX}$ and a threshold value $Th_{pTX, pRX}$ that is set or defined for every resource in the sensing window on the basis of the priority $p_{TX}$.

In addition, as in a subframe $t_z^{SL}$ as illustrated in FIG. 14, for example, a resource in a resource selection window corresponding to a resource in a sensing window that is not monitored for transmission is excluded.

In a resource selection window from a subframe $n+T_1$ to a subframe $n+T_2$, as illustrated in FIG. 14, a resource occupied by another EU is identified, and resources excluding the resource becomes a set of available resource candidates. When the set of the available resource candidates is set as $S_A$, in a case where $S_A$ is less than 20% of resources of the resource selection window, the threshold value $Th_{pTX, pRX}$ that is set for every resource of the sensing window is increased by 3 dB, and resource identification is performed again.

That is, when performing the resource identification again by increasing $Th_{pTX, pRX}$, a resource that is not excluded because RSRP is less than the threshold value is increased. In addition, RSSI of each resource of $S_A$ is measured, and a resource in which the RSSI is the minimum is added to a set $S_B$. Until the set $S_B$ of the resource candidates becomes 20% or more of the resource selection window, the operation of adding a resource which is included in $S_A$ and in which the RSSI is the minimum to $S_B$ is repeated.

A lower layer of the terminal 20 reports $S_B$ to a higher layer. The higher layer of the terminal 20 determines a resource that is to be used by performing random selection with respect to $S_B$. The terminal 20 performs sidelink transmission by using the determined resource. Note that, after securing a resource at once, the terminal 20 can periodically use the resource without performing sensing predetermined number of times (for example, $C_{resel}$ times).

Figure 15:
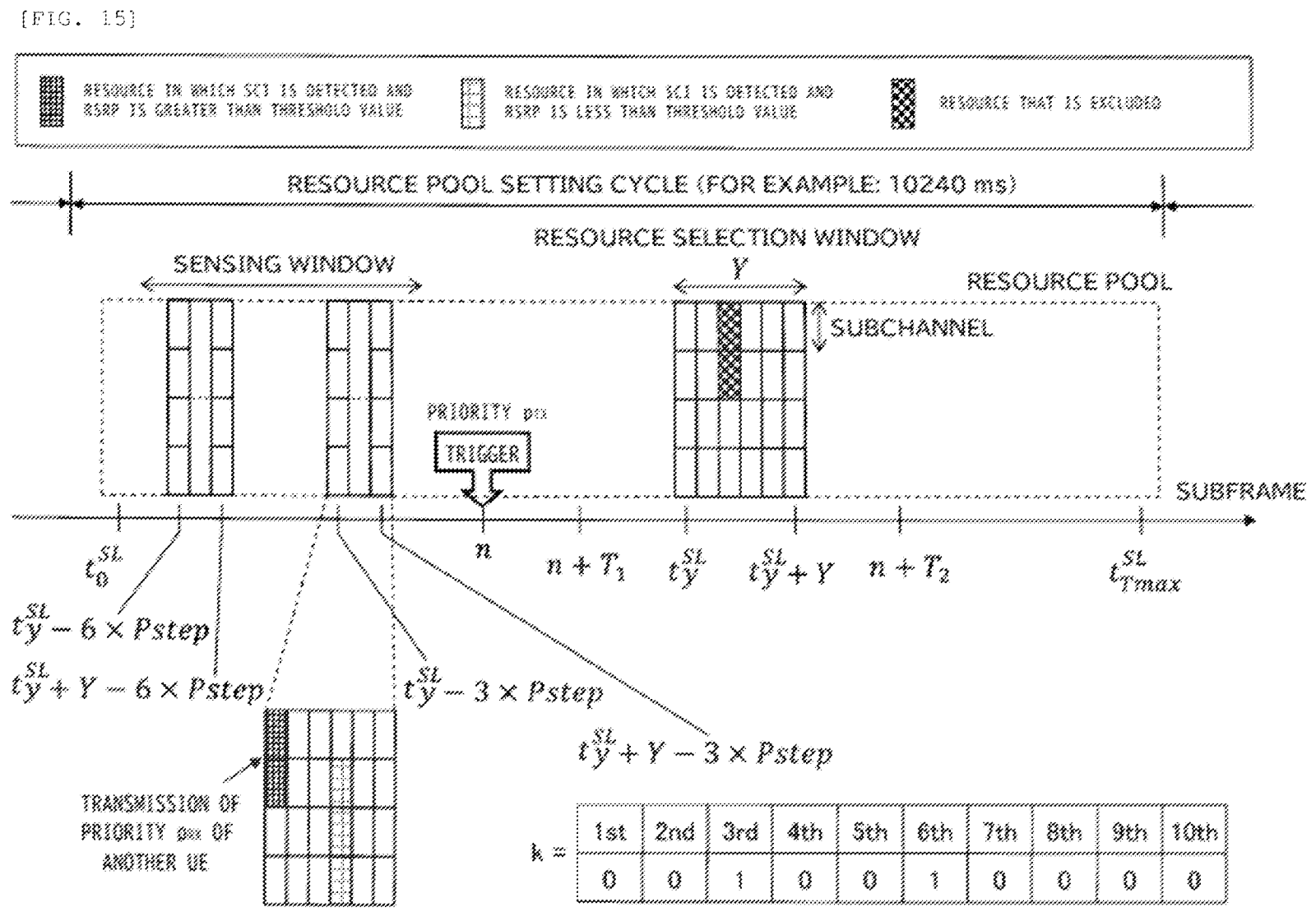

FIG. 15 is a view illustrating an example of a partial sensing operation. In a case where the partial sensing is set from a higher layer of the LTE sidelink, as illustrated in FIG. 15, the terminal 20 performs transmission by selecting a resource. As illustrated in FIG. 15, the terminal 20 performs the partial sensing with respect to a part of the sensing window in the resource pool. Due to the partial sensing, the terminal 20 receives a resource reservation field included in the SCI transmitted from another terminal 20, and identifies an available resource candidate in the resource selection window in the resource pool on the basis of the field. Next, the terminal 20 randomly selects a resource as an available resource candidate.

In addition, as illustrated in FIG. 15, resource pool setting may have a cycle. For example, the cycle may be a period of 10240 milliseconds. FIG. 15 is an example in which from a subframe $t_0^{SL}$ to a subframe $t_{Tmax}^{SL}$ are set as a resource pool. In the resource pool in the cycle, for example, a region may be set by a bit map.

In addition, as illustrated in FIG. 15, it is assumed that a transmission trigger in the terminal 20 occurs in a subframe, and priority of the transmission is $p_{TX}$. In the example in FIG. 15, Y subframes from a subframe $t_y^{SL}$ to a subframe $t_{y+Y}^{SL}$ among a subframe $n+T_1$ to a subframe $n+T_2$ are selected as a resource selection window. In addition, as illustrated in FIG. 15, it is assumed that a transmission trigger in the terminal 20 occurs in a subframe, and priority of the transmission is $p_{TX}$.

In one or a plurality of sensing windows from a subframe $t_{y-k \times Pstep}^{SL}$ to a subframe $t_{y+Y-k \times Pstep}^{SL}$ which become a Y-subframe length, for example, the terminal 20 can detect that another terminal 20 has performed transmission in the priority $p_{RX}$. For example, k may be a bit map of 10 bits. FIG. 15 illustrates an example in which a third bit and a sixth bit of a bit map k are set to "1" indicating that the partial sensing is performed. That is, in FIG. 15, from a subframe $t_{y-6 \times Pstep}^{SL}$ to a subframe $t_{y+Y-6 \times Pstep}^{SL}$ and a subframe $t_{y-3 \times Pstep}^{SL}$ to a subframe $t_{y+Y-3 \times Pstep}^{SL}$ are set as the sensing window. As described above, an $i^{th}$ bit of the bit map k corresponds to a sensing window from a subframe $t_{y-i \times Pstep}^{SL}$ to a subframe $t_{y+Y-i \times Pstep}^{SL}$.

In a case where the SCI is detected in the one or the plurality of sensing windows, and RSRP is greater than a threshold value, a resource in a resource selection window corresponding to the SCI is excluded. In addition, in a case where the SCI is detected in the sensing window, and RSRP is less than the threshold value, a resource in a resource selection window corresponding to the SCI is not excluded. For example, the threshold value may be priority $p_{TX}$ and a threshold value $Th_{pTX, pRX}$ that is set or defined for every resource in the sensing window on the basis of the priority $p_{RX}$.

In the resource selection window in which the Y subframes are set, the terminal 20 identifies a resource that is occupied by another UE, and resources excluding the resource become available resource candidates. When a set of the available resource candidates is set as $S_A$, in a case where $S_A$ is less than 20% of resources of the resource selection window, the threshold value $Th_{pTX}, p_{RX}$ that is set for every resource of the sensing window is increased by 3 dB, and resource identification is performed again. That is, when performing the resource identification again by increasing the threshold value $Th_{pTX, pRX}$, a resource that is not excluded because RSRP is less than the threshold value is increased. In addition, RSSI of each resource of $S_A$ is measured, and a resource in which the RSSI is the minimum is added to a set $S_B$. Until the set $S_B$ of the resource candidates becomes 20% or more of the resource selection window, the operation of adding a resource which is included in $S_A$ and in which the RSSI is the minimum to $S_B$ is repeated.

A lower layer of the terminal 20 reports $S_B$ to a higher layer. The higher layer of the terminal 20 may determine a resource that is to be used by performing random selection with respect to $S_B$. The terminal 20 may perform sidelink transmission by using the determined resource. Note that, after securing a resource at once, the terminal 20 can periodically use the resource without performing sensing predetermined number of times (for example, $C_{resel}$ times).

In FIG. 14 and FIG. 15, an operation of a terminal 20 on a transmission side has been description, but a terminal 20 on a reception side senses data transmission from another terminal 20 on the basis of results of sensing or partial sensing, and receives data from the other terminal 20.

A resource selection operation in the NR (for example, Non-Patent Documents 2 and 3) is basically similar to a resource selection operation in the LTE.

That is, the TX-UE excludes a specific resource, which is detected on the basis of sensing in the sensing window from total resources (referred to as $M_{total}$. At first, $M_{total}=S_A$) in the resource selection window in the resource pool, from $S_A$. The specific resource is a resource that is reserved by the SCI received by the TX-UE, and a resource in which RSRP (reception power) related to the SCI is higher than a threshold value is a resource that is not sensed, or the like.

In a case where the amount of identified resources (the amount of resources of $S_A$) is less than X % of the amount of the total resources in the resource selection window in the resource pool, the above-described processing is repeated until the amount becomes X % or more while increasing the threshold value by 3 dB. For example, X is 20. Note that, for example, one resource is a resource of "1 slot×(one or a plurality of subchannels)". In addition, RSRP may be a value measured by DM-RS of a resource of the PSCCH with which the SCI is transmitted, or a value measured by DM-RS of a resource of the PSSCH that is indicated (reserved) by the SCI.

In the TX-UE, determined $S_A$ is reported to a higher layer, and in the higher layer, for example, a transmission resource is randomly selected from $S_A$. In the NR, power saving based on the above-described partial sensing may be performed.

On the other hand, in the NR release 16 sidelink, preemption and re-evaluation functions are employed, and the terminal 20 in this embodiment can perform the pre-emption and the re-evaluation. The pre-emption and the re-evaluation are functions for Resource Allocation Mode 2 in which the terminal 20 autonomously selects a resource to be transmitted, but may be used in Mode 1.

FIG. 16 is a flowchart for describing an example of the re-evaluation. FIG. 17 is a view illustrating an example of the re-evaluation. In step S501, the terminal 20 performs sensing in the sensing window. In a case where the terminal 20 performs a power saving operation, sensing may be performed in a limited period that is defined in advance. Next, the terminal 20 identifies each resource in the resource selection window on the basis of the sensing result to determine a set $S_A$ of resource candidates (S502). Next, terminal 20 selects a resource set (r_0, r_1, . . . ) from the set $S_A$ of resource candidates (S503). The resource set may be a resource that is scheduled to be used in transmission selected in a higher layer.

In step S504, for example, at timing of $T(r\_0)–T_3$ illustrated in FIG. 17, the terminal 20 identifies each resource in the resource selection window again on the basis of the sensing result to determine the set $S_A$ of resource candidates. Next, in a case where a resource r_i is not included in $S_A$, the terminal 20 excludes r_i from the resource set (S505) to update the resource set, and terminates the re-evaluation. In the higher layer, a resource is selected from the resource set after the re-evaluation.

In an example of the re-evaluation illustrated in FIG. 17, since r_1 between a resource r_0 and a resource r_1 is not included in $S_A$ due to a re-sensing result, r_1 is excluded from a resource set. Accordingly, the terminal 20 performs transmission by using the resource r_0.

FIG. 18 is a sequence diagram illustrating an example of the pre-emption. In FIG. 17, an operation will be described by substituting "re-evaluation" with "pre-emption", and by substituting "r_0" and "r_1" with "r'_0" and "r'_1". In step S601, the terminal 20 performs sensing in a sensing window. In a case where the terminal 20 performs a power saving operation, sensing may be performed in a limited period that is defined in advance. Next, the terminal 20 identifies each resource in the resource selection window on the basis of the sensing result to determine a set $S_A$ of resource candidates (S602). Next, the terminal 20 selects a resource set (r'_0, r'_1, . . . ) from the set $S_A$ of resource candidates (S603). The resource set may be a resource that is scheduled to be used in transmission selected in a higher layer.

In step S604, at timing of $T(r\_0)–T_3$ illustrated in FIG. 17, on the basis of a sensing result, the terminal 20 identifies each resource in the resource selection window again on the basis of priority to determine the set $S_A$ of resource candidates. For example, r'_1 illustrated in FIG. 17 may be included in the set $S_A$ by re-sensing.

In a case where the pre-emption is valid, when a value prio_RX indicating priority of the SCI that is transmitted from another terminal 20 is lower than a value prio_TX indicating priority of a transport block that is transmitted the host terminal, the terminal 20 excludes the resource r'_1 from $S_A$. Note that, with regard to the value indicating the priority, the lower the value is, the higher the priority becomes. That is, in a case where the value prio_RX indicating the priority of the SCI that is transmitted from the other terminal 20 is higher than the value prio_TX indicating the priority of the transport block that is transmitted from the host terminal, the terminal 20 does not exclude the resource r'_1 from $S_A$.

Hereinafter, with regard to the priority, in a case of "high", it is assumed that the case represents that the priority is high.

In step S605, in a case where the resource r'_1 is not included in $S_A$, the terminal 20 updates r'_1 excludes r'_1 from the resource set (S605) to update the resource set $S_A$, and terminates the pre-emption. The terminal 20 selects a transmission resource from $S_A$ that is updated.
(With Regard to Problem)

As described above, in Mode 2 resource allocation in which the terminal 20 autonomously selects a resource, or the like, the terminal 20 (TX-UE) that performs sidelink transmission selects a transmission resource on the basis of resource reservation information of another terminal 20 which is acquired by sensing.

Whether or not quality of a signal transmitted with the resource selected by the TX-UE is good (whether or not interference is absent or small) depends on a position of the terminal (RX-UE) that receives the signal. However, in the related art, since the TX-UE obtains only information at a position of the TX-UE by sensing, there is a problem that the resource selected by the TX-UE may not be a resource with which the RX-UE can receive a signal with good quality.

For example, as illustrated in FIG. 19, an assumption will be made on a case where a distance between a TX-UE 20A and a RX-UE 20B is large, a UE 20C that performs transmission with a resource #A exists near the TX-UE 20A, and a UE 20D that performs transmission with a resource #B exists near the RX-UE 20B.

In this case, when assuming that the TX-UE 20A excludes the resource #A with large interference from a candidate and selects the resource #B to perform transmission with respect to the RX-UE 20B, in the RX-UE 20B, since interference from the UE 20D that performs transmission with the resource #B is large, a signal transmitted from the TX-UE 20A cannot be received with satisfactory quality.

In addition, for example, as illustrated in FIG. 20, an assumption will be made on a case where the RX-UE 20B is in a position capable of being seen from the TX-UE 20A, but the UE 20C that performs transmission with the resource #A is in a position that cannot be seen from the TX-UE 20A due to a building.

In this case, when assuming that the TX-UE 20A selects the resource #A and performs transmission to the RX-UE 20B because interference in the resource #A is absent (or small), in the RX-UE 20B, since interference from the UE 20C that performs transmission with the resource #A is large, a signal transmitted from the TX-UE 20A cannot be received with satisfactory quality.

Overview of Technology Related to this Embodiment

In this embodiment, the terminal 20 (TX-UE) selects a transmission resource of a sidelink on the basis of position information to solve the above-described problem. Note that, meaning of "selection" noted here has broad meaning including resource identification processing and resource selection processing. Hereinafter, the TX-UE is noted as the TX-UE 20A, the RX-UE is noted as the RX-UE 20B, and a third UE is noted as a third UE 20C. In addition, another UE may be noted as another UE 20B.

More specifically, the TX-UE 20A selects a resource for the sidelink transmission on the basis of position information of the RX-UE 20B (referred to as "Position Information 1") and position information (referred to as "Position Information 2") of a UE (referred to as "third UE 20C") that is a UE other than the RX-UE 20B and reserves a resource.

Note that, the third UE 20C may exist as one piece or a plurality of pieces, but in the following description, description will be given of a case where one piece of the third UE 20C exists. The processing contents are similar even in a case where a plurality of pieces of the third UEs 20C exist. That is, similar processing as in the case of one piece is performed with respect to each of the plurality of third UEs 20C.

In addition, in the following description, description will be given of a case where the TX-UE 20A acquires and uses both Position Information 1 and Position Information 2, but it is not necessary to use both Position Information 1 and Position Information 2. Any one position information may be absent. For example, in a case where position information of a UE is absent, the position is estimated by reception power of a signal received by the UE and the estimated position information may be used.

In addition, the position information may be arbitrary information indicating a position. For example, the position information may be latitude/longitude information obtained by a GPS device provided in a UE. In addition, the position information may be information of an area in which the UE exists. In addition, the position information may be a zone ID described in Non-Patent Document 1.

Hereinafter, a method in which the TX-UE 20A acquires position information of another UE (the RX-UE 20B or the third UE 20C) will be described as Example 1, and a resource identification and selection method based on the acquired position information, and the like will be described as Example 2. Example 2 is premised on Example 1.

In addition, it is assumed that Example 1 and Example 2 are based on a technology of the NR, but there is no limitation thereto. For example, in an operation based on a technology of the LTE, a technology according to the invention may be applicable.

Example 1

First, in Example 1, an example of a method in which the TX-UE 20A acquires position information of another UE (the RX-UE 20B, the third UE 20C, or the like) will be described in Example 1-1 to Example 1-8. Example 1-1 to Example 1-3 are examples from the viewpoint of how to acquire the position information, and Example 1-4 to Example 1-8 are example from the viewpoint of acquiring the position information at which timing. Each of Example 1-1 to Example 1-3 can be carried out in combination with each of Example 1-4 to Example 1-8.

In addition, in the following description, for convenience, description will be given of a configuration in which the TX-UE 20A acquires position information of another UE, but the other UE can also acquire position information of another UE except for the other UE. From this, "acquires position information" may be substituted with "shares position information".

Example 1-1

In Example 1-1, the TX-UE 20A acquires position information of another UE in an RRC layer. For example, in S701 in FIG. 21, another UE 20B transmits position information to the TX-UE 20A with PC5-RRC signaling. According to this, the TX-UE 20A acquires the position information of the other UE 20B.

Example 1-2

In Example 1-2, the TX-UE 20A acquires position information of another UE 20B in a MAC layer. For example, in S701 in FIG. 21, the other UE 20B transmits position information to the TX-UE 20A with MAC CE. According to this, the TX-UE 20A acquires the position information of the other UE 20B.

Example 1-3

In Example 1-3, the TX-UE 20A acquires position information of another UE 20B in a PHY layer. For example, in S701 in FIG. 21, the other UE 20B transmits position information to the TX-UE 20A by a signal of the PHY layer. According to this, the TX-UE 20A acquires the position information of the other UE 20B.

The signal of the PHY layer is, for example, the SCI. That is, a UE that transmits the SCI transmits the own position information in a state of being included in the SCI. The SCI may be SCI in unicast communication, SCI in groupcast communication, or SCI in broadcast communication.

In addition, the signal of the PHY layer may be S-SSB. The S-SSB may be referred to as a synchronization signal or a synchronization signal block. S-PSS, S-SSS, or PSBCH may be included in the S-SSB. The signal of the PHY layer may be, for example, the PSBCH in the S-SSB.

Example 1-4

In Example 1-4, the TX-UE 20A acquires position information of another UE 20B at the time of RRC connection with the other UE 20B (specifically, at the time of PC5-RRC connection setup). As an example, in S701 in FIG. 21, when transmitting an RRC connection request to the TX-UE 20A, the other UE 20B transmits the own position information in a state of being included in the RRC connection request.

Alternatively, in S801 in FIG. 22, the TX-UE 20A transmits the RRC connection request to the other UE 20B, and in S802, when transmitting a response (RRC connection completion) to the TX-UE 20A, the other UE 20B transmits the own position information in a state of being included in the response.

Example 1-5

In Example 1-5, the TX-UE 20A periodically acquires position information of another UE 20B. For example, in S701 in FIG. 21, the other UE 20B periodically transmits the own position information. According to this, the TX-UE 20A can periodically grasp a position of the other UE 20B. The periodicity in a case of periodically transmitting (or receiving) the position information may be defined in specifications or the like and each UE may retain the periodicity in advance. The periodicity may be pre-configured or may be configured from the base station 10 to the UE. Note that, set or pre-set may be noted as "(pre-)configuration".

Example 1-6

In Example 1-6, at the time of transmitting data, another UE 20B transmits the own position information in a state of being included in the data.

For example, in S701 in FIG. 21, when transmitting arbitrary data with the PSSCH, the other US 20B transmits the data and the position information to the TX-UE 20A. According to this, the TX-UE 20A can acquire the position information of the other UE 20B. In Example 1-6, the other UE 20B determines sharing of the own position information with a UE other than the other UE 20B.

Example 1-7

In Example 1-7, position information of another UE 20B is acquired on the basis of a request from the TX-UE 20A.

For example, in S801 in FIG. 22, the TX-UE 20A transmits a request indicating request for position information of the other UE 20B to the other UE 20B. In S802 in FIG. 22, the other UE 20B transmits the own position information to the TX-UE 20A in correspondence with the request in S801. Note that, in Example 1-7, in a case of receiving the request in S801, the other UE 20B may determine non-transmission of the position information.

Example 1-8

In Example 1-8, position information of another UE 20B is acquired on the basis of a trigger from the TX-UE 20A.

For example, in S801 in FIG. 22, the TX-UE 20A transmits a trigger for acquiring position information of the other UE 20B to the other UE 20B. In S802 in FIG. 22, the other UE 20B transmits the own position information to the TX-UE 20A in correspondence with the trigger in S801. Note that, in Example 1-8, it is assumed that the other UE 20B forcibly transmits the position information in a case of receiving the trigger in S801.

Other Examples

The base station 10 may acquire position information of each UE and the base station 10 may notify the UE of the position information of the UE as illustrated in FIG. 23.

Hereinbefore, respective examples in Example 1 have been described, but the TX-UE 20A may acquire Position Information 1 and Position Information 2 in a similar manner or by methods different from each other.

In addition, the position information acquired by the TX-UE 20A may have an expiration data (validity period). The expiration data may be defined in specifications or the like in advance or may be included in the position information as partial information of the position information. In addition, the expiration data may be (pre-)configured.

For example, it is assumed that the expiration data is T seconds, and the TX-UE 20A has acquired the position information of the other UE 20B at time t. In a period from time t to time t+T, as long as the position information of the other UE 20B is not reacquired, the position information becomes invalid at the time t+T. The TX-UE 20A retaining the invalid position information does not use the position information. Alternatively, the TX-UE 20A may delete the invalid position information.

Example 2

Next, Example 2 will be described. In Example 2, the TX-UE 20A performs identification of a transmission resource of a sidelink (determination of a candidate set of the transmission resource) on the basis of Position Information 1 and Position Information 2. With regard to more specific processing contents, hereinafter, description will be given with reference to Example 2-1 to Example 2-4.

Example 2-1

In Example 2-1, in resource identification processing (processing of determining a set $S_A$ of candidates of a transmission resource which is reported to a higher layer) performed in a lower layer of the TX-UE 20A, the TX-UE 20A performs exclusion (removal) of a resource on the basis of Position Information 1 and Position Information 2.

In the resource identification processing, as illustrated in FIG. 24, the TX-UE 20A excludes a specific resource detected on the basis of sensing in a sensing window from total resources (these will be referred to as $M_{total}$. At first, $M_{total}=S_A$) in a resource selection window in a resource pool. The specific resource is a resource that is reserved by SCI received by the TX-UE 20A, and examples thereof include a resource in which RSRP (reception power) related to the SCI is higher than a threshold value, a resource that is not monitored for transmission, and the like.

In a case where the amount of identified resources (the amount of resources of $S_A$) is less than X % of the amount of the total resources in the resource selection window in the resource pool, the above-described processing is repeated until the amount becomes X % or more while increasing the threshold value by 3 dB. For example, X is 20.

Note that, in FIG. 24, To is a value that is configured (or pre-configured) by the TX-UE 20A, and is, for example, 1100 ms or 100 ms. $T_1$ is a value that is determined by the TX-UE 20A under a condition of $T_1 \le T_{proc,1}$. $T_2$ is a value that is determined by the TX-UE 20A under a condition of $T_{proc,1} \le T_2 \le$ Packet Delay Budget.

The RSRP related to the SCI may be RSRP that is measured by DM-RS in a resource of a PSCCH with which the SCI is transmitted, or RSRP that is measured by DM-RS in a resource of a PSSCH that is designated (reserved) by the SCI. This is also true of RSRP to be described below.

A threshold value is a value that is determined by priority that is designated by the SCI that is received and priority of the TX-UE 20A. However, since the priority of the TX-UE 20A is a value that is set by the TX-UE 20A, substantially, the threshold value may be considered to be substantially determined by the priority of the received SCI and may be noted as Th (prio_RX).

In Example 2-1, in the resource identification processing, the TX-UE 20A excludes a resource reserved by a third UE 20C located at a position indicated by Position Information 2 within a specific range from a position (position of the RX-UE 20B) indicated by Position Information 1 from $S_A$ by a specific method. Note that, in this specification, "reservation" may be substituted with "instruction" or "designation".

For example, the TX-UE 20A excludes a resource reserved by a third UE located at a position indicated by Position Information 2 in which a distance from a position (position of an RX-UE) indicated by Position Information 1 is equal to or less than a threshold value from $S_A$ by a specific method. Note that, this is illustrative only, and with respect to definition of the "specific range", any definition described in Example 2-3 is applicable.

Note that, the "threshold value" in this embodiment may be a value defined in advance in specifications or the like, may be a pre-configured value, or may be a value configured to a UE from the base station 10.

An image in this case is illustrated in FIG. 25. As illustrated in FIG. 25, since a distance between the RX-UE 20B and the third UE 20C is close (for example, the distance is equal to or less than the threshold value), the TX-UE 20A excludes a resource that is sensed by the SCI received from the third UE 20C and is reserved by the third UE 20C by a specific method.

As the above-described specific method, variation described in Example 2-1-A to Example 2-1-D is exemplified. Examples 2-1-A to 2-1-D may be applied alone or in a combination of a plurality of examples.

Example 2-1-A

In Example 2-1-A, the TX-UE 20A performs resource exclusion (removal) without depending on RSRP of the SCI received from the third UE 20C. That is, in a typical operation, a reserved resource in which RSRP is greater than the threshold value is excluded, but in Example 2-1-A, the TX-UE 20A excludes the reserved resource of the third UE 20C from $S_A$ without depending on RSRP related to the SCI received from the third UE 20C.

FIG. 24 illustrates an operation of the TX-UE 20A in Example 2-1-A. As illustrated in FIG. 24, the TX-UE 20A excludes a resource reserved by the third UE 20C from $S_A$ without performing evaluation on RSRP related to the third UE 20C.

Example 2-1-B

In Example 2-1-B, the TX-UE 20A corrects RSRP related to the SCI that is received from the third UE 20C. Alternatively, the TX-UE 20A correct Th(prio_RX) related to the SCI that is received from the third UE 20C.

Alternatively, the TX-UE 20A corrects RSRP related to the SCI that is received from the third UE 20C and corrects Th(prio_RX).

The above-described correction is correction that makes the resource reserved by the third UE 20C easy to be removed from $S_A$. For example, in a case of measuring RSRP related to the SCI received from the third UE 20C as "A", the TX-UE 20A uses "A+B" (RSRP is increased) as the RSRP that is used for evaluation. According to this, a possibility that RSRP becomes higher than Th(prio_RX) increases.

In addition, for example, in a case of determining Th(prio_RX) related to the SCI received from the third UE 20C as "C", the TX-UE 20A uses "C−D" (the threshold value is decreased) as Th(prio_RX) that is used in evaluation. According to this, a possibility that RSRP becomes higher than Th(prio_RX) increases.

Example 2-1-C

In Example 2-1-C, the TX-UE 20A controls application of Example 2-1-A or Example 2-1-B on the basis of priority.

The priority may be priority of the TX-UE 20A or priority of the SCI of the third UE 20C.

For example, in a case of determining that the priority of the TX-UE 20A is higher than the priority of the SCI of the third UE 20C, the TX-UE 20A applies Example 2-1-A or Example 2-1-B.

In addition, in a case of determining that the priority of the TX-UE 20A is higher than the priority of the SCI of the third UE 20C, the TX-UE 20A may apply Example 2-1-A, and in a case of determining that the priority of the TX-UE 20A is not higher than the priority of the SCI of the third UE 20C, the TX-UE 20A may apply Example 2-1-B.

Example 2-1-D

In Example 2-1-D, the TX-UE 20A controls application of Example 2-1-A or Example 2-1-B on the basis of a position of the TX-UE 20A, a position (position of the RX-UE 20B) indicated by Position Information 1, or a position (position of the third UE 20C) indicated by Position Information 2. The TX-UE 20A may control application of Example 2-1-A or Example 2-1-B on the basis of the position of the TX-UE 20A, the position (position of the RX-UE 20B) indicated by Position Information 1, and the position (position of the third UE 20C) indicated by Position Information 2.

For example, in a case of determining that a distance between the TX-UE 20A and the RX-UE 20B is equal to or greater than a threshold value, the TX-UE 20A applies Example 2-1-A or Example 2-1-B. In addition, in a case of determining that a distance between the TX-UE 20A and the third UE 20C is equal to or greater than the threshold value, the TX-UE 20A may apply Example 2-1-A or Example 2-1-B. In addition, in a case of determining that the distance between the TX-UE 20A and the RX-UE 20B is equal to or greater than the threshold value and the distance between the TX-UE 20A and the third UE 20C is equal to or greater than the threshold value, the TX-UE 20A may apply Example 2-1-A or Example 2-1-B.

in addition, the TX-UE 20A may correct RSRP or Th(prio_RX) in Example 2-1-B on the basis of the distance between the TX-UE 20A and the RX-UE 20B and the distance between the TX-UE 20A and the third UE 20C. In addition, the TX-UE 20A may correct RSRP or Th(prio_RX) in Example 2-1-B on the basis of the distance between the TX-UE 20A and the RX-UE 20B and the distance between the TX-UE 20A and the third UE 20C.

As an example, in a case of determining that the distance between the TX-UE 20A and the RX-UE 20B (or the third UE 20C) is equal to or greater than the threshold value, the TX-UE 20A sets Th(prio_RX) as "A", and in a case of determining that the distance between the TX-UE 20A and the RX-UE 20B (or the third UE 20C) is not equal to or greater than the threshold value, the TX-UE 20A sets Th(prio_RX) as "B". Here, a relationship of A<B is satisfied. That is, the greater the distance between the TX-UE 20A and the RX-UE 20B (or the third UE 20C) is, the more the reserved resource of the third UE 20C is likely to be excluded.

In addition, as an example, in a case where the distance between the TX-UE 20A and the RX-UE 20B (or the third UE 20C) is equal to or greater than the threshold value, the TX-UE 20A performs correction of increasing RSRP by "C", and in a case where the distance between the TX-UE 20A and the RX-UE 20B (or the third UE 20C) is not equal to or greater than the threshold value, the TX-UE 20A performs correction of increasing RSRP by "D". Here, a relationship of C>D is satisfied. That is, the greater the distance between the TX-UE 20A and the RX-UE 20B (or the third UE 20C) is, the more the reserved resource of the third UE 20C is likely to be excluded.

In addition, the TX-UE 20A may control application of Example 2-1-A or Example 2-1-B on the basis of reception power of a signal, which is transmitted from the third UE 20C, in the TX-UE 20A. The reception power stated here may be reception power of an arbitrary signal. The reception power may be reception power (RSRP) of DM-RS of the PSCCH or PSSCH related to the SCI, may be reception power of a synchronization signal, or may be reception power other signals.

For example, in a case of determining that the distance between the TX-UE 20A and the RX-UE 20B or the third UE 20C is equal to or less than the threshold value, and the reception power of a signal transmitted from the third UE 20C is equal to or less than a threshold value, the TX-UE 20A may apply Example 2-1-A or Example 2-1-B. These examples assume that the third UE 20C is out of sight of the TX-UE 20A as illustrated in FIG. 20.

Other Examples of Example 2-1

The processing in Example 2-1 may be applied to either re-evaluation or pre-emption, or both the re-evaluation and the pre-emption. That is, in the re-evaluation and the pre-emption, evaluation of a transmission resource is performed again before performing actual transmission after determining $S_A$, but when $S_A$ is created again at the time of the evaluation, processing in Example 2-1 may be applied.

Effect of Example 2-1

According to Example 2-1, the TX-UE 20A can select a transmission resource in consideration of an interference situation in the RX-UE 20B, or quality of a signal transmitted from the TX-UE 20A to the RX-UE 20B (quality at the time of reception in the RX-UE 20B). According to this, reception reliability in the RX-UE 20B can be improved.

In addition, in Example 2-1, there is an advantage that only an operation in a lower layer (that is, PHY) may be changed from an existing technology, and a configuration of a higher layer may not be changed.

Example 2-2

Next, Example 2-2 will be described. Note that, Example 2-1 and Example 2-2 may be performed in combination with each other.

As described above, in selection of a transmission resource by the TX-UE 20A, the TX-UE 20A performs resource identification processing (processing of determining a set $S_A$ of candidates of a transmission resource which is reported to a higher layer) in a lower layer, $S_A$ is reported from the lower layer to the higher layer, and in the higher layer, the TX-UE 20A selects a resource (one or a plurality of resources) that is actually used in transmission in $S_A$. The selection is performed, for example, by randomly selecting a resource in $S_A$. The processing is referred to as resource selection.

In Example 2-2, the TX-UE 20A performs resource selection on the basis of Position Information 1 and Position Information 2. Note that, in Example 2-2, with respect to each resource of $S_A$ which is determined in the lower layer, in addition to resource information (a slot number, subchannel information, or the like), information (a transmission source, Th(prio_RX), reservation information, or the like) related to the SCI used when identifying each resource, and RSRP may also be reported from the lower layer to the higher layer.

More specifically, in Example 2-2, with respect to a resource reserved by the third UE 20C located at a position indicated by Position Information 2 within a specific range from a position (position of the RX-UE 20B) indicated by Position Information 1, the TX-UE 20A performs resource selection by a specific method.

For example, the TX-UE 20A performs resource selection by a specific method with respect to a resource reserved by the third UE 20C located at the position indicated by Position Information 2 in which a distance from the position (position of the RX-UE 20B) indicated by Position Information 1 is equal to or less than a threshold value. Note that, this is illustrative only, and any definition described in Example 2-3 may be applied to definition of the "specific range".

An image in this case is as illustrated in FIG. 25. As illustrated in FIG. 25, since a distance between the RX-UE 20B and the third UE 20C is close (for example, the distance is equal to or less than the threshold value), with respect to a resource that is sensed by the SCI received from the third UE 20C and is reserved by the third UE 20C, the TX-UE 20A performs resource selection by a specific method.

As the above-described specific method, variation described in Example 2-2-A to Example 2-2-D is exemplified. Examples 2-2-A to 2-2-D may be applied alone or in a combination of a plurality of examples.

Example 2-2-A

In Example 2-2-A, in a case of determining that a reserved resource (referred to as a resource X) of the third UE 20C and a resource (referred to as a resource Y) other than the resource are included in $S_A$ that is a set of identified candidate resources, the TX-UE 20A performs resource selection by giving priority to the resource Y.

For example, it may be assumed that the TX-UE 20A selects the resource X in $S_A$ in a probability of A % and selects the resource X in a probability of B %. Here, a relationship of A<B is satisfied.

FIG. 26 illustrates an example. In the example in FIG. 26, the TX-UE 20A includes the reserved resource (resource X) of the third UE 20C in $S_A$, but does not select the resource X in the resource selection processing.

According to Example 2-2-A, it is possible to lower a probability in which the resource X is selected in the resource selection processing.

Example 2-2-B

In Example 2-2-B, in a case where the resource X and the resource Y are included in $S_A$, the TX-UE 20A selects a resource from the resource Y as long as the resource Y exists.

For example, the resource X, a resource Y1, and a resource Y2 are included in $S_A$, if one resource is selected, the TX-UE 20 excludes the resource X, and selects one resource between the resource Y1 and the resource Y2 as a transmission resource.

Example 2-2-C

In Example 2-2-C, the TX-UE 20A controls application of Example 2-2-A or Example 2-2-B on the basis of priority.

The priority may be priority of the TX-UE 20A or priority of the SCI of the third UE 20C.

For example, in a case of determining that the priority of the TX-UE 20A is higher than the priority of the SCI of the third UE 20C, the TX-UE 20A applies Example 2-2-A or Example 2-2-B.

Example 2-2-D

In Example 2-2-D, the TX-UE 20A controls application of Example 2-2-A or Example 2-2-B on the basis of a position of the TX-UE 20A, a position (position of the RX-UE 20B) indicated by Position Information 1, or a position (position of the third UE 20C) indicated by Position Information 2. The TX-UE 20A may control application of Example 2-2-A or Example 2-2-B on the basis of the position of the TX-UE 20A, the position (position of the RX-UE 20B) indicated by Position Information 1, and the position (position of the third UE 20C) indicated by Position Information 2.

For example, in a case of determining that a distance between the TX-UE 20A and the RX-UE 20B is equal to or greater than a threshold value, the TX-UE 20A applies Example 2-2-A or Example 2-2-B. In addition, in a case of determining that a distance between the TX-UE 20A and the third UE 20C is equal to or greater than the threshold value, the TX-UE 20A may apply Example 2-2-A or Example 2-2-B. In addition, in a case of determining that the distance between the TX-UE 20A and the RX-UE 20B is equal to or greater than the threshold value and the distance between the TX-UE 20A and the third UE 20C is equal to or greater than the threshold value, the TX-UE 20A may apply Example 2-2-A or Example 2-2-B.

In addition, the TX-UE 20A may correct selection probability in Example 2-2-A on the basis of the distance between the TX-UE 20A and the RX-UE 20B, and the distance between the TX-UE 20A and the third UE 20C. In addition, the TX-UE 20A ma correct selection probability in Example 2-2-A on the basis of the distance between the TX-UE 20A and the RX-UE 20B, and the distance between the TX-UE 20A and the third UE 20C.

As an example, in a case where the distance between the TX-UE 20A and the RX-UE 20B (or the third UE 20C) is equal to or greater than a threshold value, the TX-UE 20A sets selection probability of the resource X as "A", and in a case where the distance between the TX-UE 20A and the RX-UE 20B (or the third UE 20C) is not equal to or greater than a threshold value, the TX-UE 20A sets the selection probability as "B". Here, a relationship of A<B is established. That is, the greater the distance between the TX-UE 20A and the RX-UE 20B (or the third UE 20C) is, the less the reserved resource of the third UE 20C is likely to be selected.

In addition, the TX-UE 20A may control application of Example 2-2-A or Example 2-2-B on the basis of reception power of a signal, which is transmitted from the third UE 20C, in the TX-UE 20A. The reception power noted here may be reception power of an arbitrary signal. The reception power may be reception power of DM-RS of the PSCCH or PSSCH related to the SCI, may be reception power of a synchronization signal, or may be reception power other signals.

For example, in a case of determining that the distance between the TX-UE 20A and the RX-UE 20B or the third UE 20C is equal to or less than the threshold value, and the reception power of a signal transmitted from the third UE 20C is equal to or less than a threshold value, the TX-UE 20A may apply Example 2-2-A or Example 2-2-B. These examples assume that the third UE 20C is out of sight of the TX-UE 20A as illustrated in FIG. 20.

Other Examples of Example 2-2

The processing in Example 2-2 may be applied to either re-evaluation or pre-emption, or both the re-evaluation and the pre-emption. That is, in the re-evaluation and the pre-emption, evaluation of a transmission resource is performed again before performing actual transmission after determining $S_A$, but processing in Example 2-2 may be applied when selecting the transmission resource.

Effect of Example 2-2

According to Example 2-2, the TX-UE 20A can select a transmission resource in consideration of an interference situation in the RX-UE 20B, or quality of a signal transmitted from the TX-UE 20A to the RX-UE 20B (quality at the time of reception in the RX-UE 20B). According to this, reception reliability in the RX-UE 20B can be improved.

In addition, in Example 2-2, there is an advantage that basically, only an operation in a higher layer (that is, a MAC layer) may be changed from an existing technology, and a configuration of a lower layer may not be changed.

Example 2-3

As described in Example 2-1 and Example 2-2, in Example 2, with respect to resource reservation by the third UE 20C located at a position indicated by Position Information 2 within a specific range from a position (position of the RX-UE 20B) indicated by Position Information 1, the TX-UE 20A performs resource identification processing or resource selection processing by a specific method.

In Example 2-1 and Example 2-2, description has been given of a case where a distance is used as an example of a determination criterion (definition) of whether the RX-UE 20B and the third UE 20C are within a "specific range", but the determination criterion of the "specific range" is not limited to the distance. In Example 2-3, Example 2-3-A and Example 2-3-B which are variations of the determination criterion of the "specific range" will be described. Example 2-3 is applicable to any of Examples 2-1, 2-2, and 2-4.

Example 2-3-A

In Example 2-3-A, a zone (zone identified by a zone ID) calculated by zone identity calculation described in Non-Patent Document 1 is used. For example, each zone is one square illustrated in FIG. 27. Note that, a configuration in which the zone calculated by the zone identity calculation described in Non-Patent Document 1 is used is illustrative only, and a zone (may be referred to as an area) defined by a method other than the zone may be used.

In Example 2-3-A, in a case of determining that Position Information 1 and Position Information 2 are in the same zone, the TX-UE 20A determines that the RX-UE 20B and the third UE 20C are within a "specific range".

In the example in FIG. 27, since Position Information 1 and Position Information 2 are in the same zone, it can be determined that the RX-UE 20B and the third UE 20C are in the "specific range".

For example, in a case where a zone ID of Position Information 1 is 5 and a zone ID of Position Information 2 is 5, since the zone ID is the same in each case, positions are in the same zone, and it can be determined that the RX-UE 20B and the third UE 20C are in the "specific range".

Example 2-3-B

Example 2-3-B is similar to the above-described examples, and in a case where a distance between a position indicated by Position Information 1 and a position indicated by Position Information 2 is equal to or less than a specific value (or less than the specific value), it is determined that the position indicated by Position Information 1 and the position indicated by Position Information 2 are within the specific range. The "specific value" may be referred to as "threshold value".

The specific value may be value defined by specifications or the like, may be a pre-configured value, or may be a value configured to a UE from the base station.

"Distances" including the "distance" described so far may be a zone-based distance, a Euclidean distance, a Manhattan distance, or a distance based on other standards. 2-3-B in FIG. 27 shows an example of the "specific range" according to the zone-based distance as an example.

Note that, the Manhattan distance is a distance measured through road partitioned like a grid pattern.

Effect of Example 2-3

According to Example 2-3, it is possible to determine a resource of which quality is greatly different between the TX-UE 20A and the RX-UE 20B. In addition, when the determined resource is not used, reception reliability in the RX-UE 20B can be improved. In addition, since the third UE 20C is not considered more than necessary, it is possible to avoid complication of a terminal configuration.

Example 2-4

Next, Example 2-4 will be described. Example 2-4 is an example related to application of an operation relating to pre-emption. An operation example of Example 2-4 will be described with reference to a flowchart illustrated in FIG. 28.

In S901, the TX-UE 20A determines $S_A$ by resource identification processing. In S902, the TX-UE 20A selects a resource (referred to as a resource scheduled to be used) that is used in transmission in $S_A$.

In S903, the TX-UE 20A determines whether or not the resource scheduled to be used is instructed (reserved) by another UE (here, referred to as the third UE 20C) by sensing of the SCI before performing transmission using the resource scheduled to be used.

In a case of determining that the resource scheduled to be used is instructed (reserved) by the other UE, the TX-UE 20A determines whether or not to perform an operation related to pre-emption (that is, reselection of the resource) on the basis of Position Information 1 (position of the RX-UE 20B) and Position Information 2 (position of the third UE 20C).

With regard to the determination based on Position Information 1 (position of the RX-UE 20B) and Position Information 2 (position of the third UE 20C), for example, in S904, the TX-UE 20A determines whether or not the position of the third UE 20C is within a specific range from the position of the RX-UE 20B. In a case where it is determined that the position is within the specific range, in S905, an operation related to pre-emption is performed.

In addition, in a case of determining that the position of the third UE 20C is out of the specific range from the position of the RX-UE 20B, the TX-UE 20A does not perform the operation related to pre-emption.

Example 2-3 may be applicable to the "specific range". Note that, the "specific value" (threshold value) may be a value different between Example 2-1 and Example 2-2, and Example 2-4.

in addition, for example, with regard to a resource scheduled to be used, the operation related to pre-emption is an operation in which the resource scheduled to be used is not used when priority of the SCI of the third UE 20C is higher than priority of the TX-UE 20A (the resource is excluded from $S_A$), and another resource is selected from $S_A$.

According to Example 2-4, the TX-UE 20A can select a transmission resource in consideration of an interference situation in the RX-UE 20B, or quality of a signal transmitted from the TX-UE 20A to the RX-UE 20B (quality at the time of reception in the RX-UE 20B).

Other Examples

The operations described in Example 1 and Example 2 may be applied to an operation in which an arbitrary terminal 20 autonomously sets (or allocates) a transmission resource of another terminal 20. In addition, the operations described in Example 1 and Example 2 are not limited to the V2X terminal, and are applicable to all terminals which perform D2D.

In addition, the operations described in Example 1 and Example 2 may be performed by a specific resource pool. For example, the specific resource pool may be a resource pool that is available to a terminal 20 subsequent to Rel-17 of the NR.

(Apparatus Configuration)

Next, description will be given of a functional configuration example of the base station 10 and the terminal 20 which execute the above-described processing and operations. The base station 10 and the terminal 20 are provided with functions for carrying out Example 1 and Example w described above. However, the base station 10 and the terminal 20 may be provided with functions of any one example between Example 1 and Example 2.

<Base Station 10>

FIG. 29 is a view illustrating an example of a functional configuration of the base station 10. As illustrated in FIG. 17, the base station 10 includes a transmitting unit 110, a receiving unit 120, a setting unit 130, and a control unit 140. The functional configuration illustrated in FIG. 29 is illustrative only. A functional classification or the name of the functional units may be arbitrarily set as long as the operation according to this embodiment of the invention can be executed. The transmitting unit 110 and the receiving unit 120 may be referred to as a communication unit.

The transmitting unit 110 includes a function of generating a signal that is transmitted to the terminal 20 side and wirelessly transmitting the signal. The receiving unit 120 includes a function of receiving various signals transmitted from the terminal 20, and acquiring, for example, information of a higher layer from the received signals. In addition, the transmitting unit 110 has a function of transmitting NR-PSS, NR-SSS, NR-PBCH, DL/UL control signals, DL data, and the like to the terminal 20.

The setting unit 130 stores configuration information that is set in advance and various pieces of configuration information transmitted to the terminal 20 in a storage device, and reads out the various pieces of configuration information from the storage device as necessary.

For example, the control unit 140 performs resource allocation, control of the entirety of the base station 10, and the like. Note that, a functional unit relating to signal transmission in the control unit 140 may be included in the transmitting unit 110, and a functional unit relating to signal reception in the control unit 140 may be included in the receiving unit 120. In addition, the transmitting unit 110 and the receiving unit 120 may be referred to as a transmitter and a receiver, respectively.

<Terminal 20>

FIG. 30 is a view illustrating an example of a functional configuration of the terminal 20. As illustrated in FIG. 30, the terminal 20 includes a transmitting unit 210, a receiving unit 220, a setting unit 230, and a control unit 240. The functional configuration illustrated in FIG. 30 is illustrative only. A functional classification or the name of the functional units may be arbitrarily set as long as the operation according to this embodiment of the invention can be executed. The transmitting unit 210 and the receiving unit 220 may be referred to as a communication unit.

The transmitting unit 210 creates a transmission signal from transmission data, and wireless transmits the transmission signal. The receiving unit 220 wirelessly receives various signals, and acquires signals of a higher layer from a received physical layer signal.

The setting unit 230 stores various pieces of configuration information received from the base station 10 by the receiving unit 220 in a storage device, and reads out the various pieces of configuration information from the storage device as necessary. In addition, the setting unit 230 also stores configuration information that is set in advance. Examples of the contents of the configuration information include the configuration information described in Examples 1 and 2, and the like. The control unit 240 performs the resource identification processing and the resource selection processing described in Example 2, and the like.

Note that, a functional unit relating to signal transmission in the control unit 240 may be included in the transmitting unit 210, and a functional unit relating to signal reception in the control unit 240 may be included in the receiving unit 220. In addition, the transmitting unit 210 and the receiving unit 220 may be referred to as a transmitter and a receiver, respectively.

According to this embodiment, at least, a terminal and a resource control method described, for example, in respective items described below are provided.

(Item 1)

A terminal including:

a receiving unit that acquires any one or both position information of a reception terminal and position information of a third terminal; and a control unit that performs resource exclusion processing by a specific method with respect to a reserved resource by the third terminal within a specific range from the reception terminal on the basis of the position information acquired by the receiving unit in identification processing of candidates of a transmission resource that is used in a sidelink.

(Item 2)

The terminal according to Item 1, wherein the control unit, excludes the reserved resource from the set of the candidates without depending on reception power of a signal received from the third terminal, corrects the reception power that is used in the resource exclusion processing, or corrects a threshold value based on priority of the third terminal which is used in the resource exclusion processing.

(Item 3)

A terminal including:

a receiving unit that acquires any one or both position information of a reception terminal and position information of a third terminal; and a control unit that preferentially selects a resource other than a reserved resource by the third terminal within a specific range from the reception terminal on the basis of the position information acquired by the receiving unit in resource selection processing of selecting a transmission resource that is used from a set of candidates of a transmission resource that is used in a sidelink.

(Item 4)

The terminal according to Item 3, wherein the control unit, uses selection probability lower than selection probability of a resource other than the reserved resource as selection probability of the reserved resource, or in a case where a resource other than the reserved resource exists in the set of the candidates, selects the resource.

(Item 5)

A terminal including:

a receiving unit that acquires any one or both position information of a reception terminal and position information of a third terminal; and a control unit that selects a transmission resource scheduled to be used from a set of candidates of a transmission resource that is used in a sidelink, and determines whether or not to perform an operation related to pre-emption depending on whether or not the reception terminal and the third terminal are within a specific range on the basis of the position information acquired by the receiving unit in a case where the transmission resource scheduled to be used is instructed by the third terminal.

(Item 6)

A resource control method executed by a terminal, the method including:

a reception step of acquiring any one or both position information of a reception terminal and position information of a third terminal; and a step of performing resource exclusion processing by a specific method with respect to a reserved resource by the third terminal within a specific range from the reception terminal on the basis of the position information acquired by the reception step in identification processing of candidates of a transmission resource that is used in a sidelink.

According to any of Item 1 to Item 6, there is provided a technology enabling a reception terminal to select a transmission resource in order to receive a signal with good quality.

(Hardware Configuration)

The block diagrams (FIG. 29 and FIG. 30) which are used in description of the embodiment illustrate blocks in a function unit. The function blocks (constituent units) are realized by an arbitrary combination of at least one of hardware and software. In addition, means for realizing respective function blocks is not particularly limited. That is, the respective function blocks may be realized by one device that is physically or logically combined. In addition, two or more devices, which are physically or logically separated from each other, may be directly or indirectly connected (for example, in a wired manner, a wireless manner, or the like), and the respective function blocks may be realized by a plurality of the devices. The function blocks may be realized by combining software to the one device or the plurality of devices.

Examples of functions include determining, calculating, computing, processing, deriving, examining, searching, confirming, receiving, transmitting, outputting, accessing, solving, selecting, establishing, comparing, assuming, expecting, regarding, broadcasting, notifying, communicating, forwarding, configuring, reconfiguring, allocation (mapping), assigning, and the like, but there is no limitation thereto. For example, a function block (constituent unit) that realizes a transmission function is referred to as a transmitting unit or a transmitter. A realization method of any of the functions is not particularly limited as described above.

For example, any of the base station 10, the terminal 20, and the like in the embodiment of the present disclosure may function as a computer that performs processing of a radio communication method of the present disclosure. FIG. 31 is a view illustrating an example of a hardware configuration of the base station 10 and the terminal 20 according to the embodiment of the present disclosure. The base station 10 and the terminal 20 may be configured as a computer device that physically includes a processor 1001, a storage device 1002, an auxiliary storage device 1003, a communication device 1004, an input device 1005, an output device 1006, a bus 1007, and the like.

Note that, in the following description, a term "apparatus" may be read as a circuit, a device, a unit, or the like. The hardware configuration of the base station 10 and the terminal 20 may include the respective devices illustrated in the drawing one by one or in a plural number, or may not include a part of the devices.

Respective functions in the base station 10 and the terminal 20 are realized by loading predetermined software (program) on hardware such as the processor 1001 and the storage device 1002 so as to allow the processor 1001 to perform an arithmetic operation, and by controlling communication with the communication device 1004 or by controlling at least one of reading-out and writing of data in the storage device 1002 and the auxiliary storage device 1003.

For example, the processor 1001 allows an operating system to operate so as to control the entirety of the computer. The processor 1001 may be constituted by a central processing unit (CPU) that includes an interface with a peripheral device, a control device, an arithmetic operation device, a register, and the like. For example, the control unit 140, the control unit 240, and the like may be realized by the processor 1001.

In addition, the processor 1001 reads out a program (a program code), a software module, data, or the like from at least one of the auxiliary storage device 1003 and the communication device 1004 into the storage device 1002, and performs various kinds of processing according to the program, the software module, the data, or the like. As the program, a program that causes the computer to execute at least a part of the operations described in the embodiment is used. For example, the control unit 140 of the base station 10 illustrated in FIG. 29 may be realized by a control program that is accommodated in the storage device 1002 and operates by the processor 1001. In addition, for example, the control unit 240 of the terminal 20 illustrated in FIG. 30 may be realized by a control program that is accommodated in the storage device 1002 and operates by the processor 1001. The above-described various kinds of processing have been described to be executed by one processor 1001, but may be simultaneously or sequentially executed by two or more processors 1001. The processor 1001 may be mounted by one or more chips. Furthermore, the program may be transmitted from a network through electric communication line.

The storage device 1002 is a computer-readable recording medium, and may be constituted by, for example, at least one of a read only memory (ROM), an erasable programmable ROM (EPROM), an electrically erasable programmable ROM (EEPROM), a random access memory (RAM), and the like. The storage device 1002 may be referred to as a register, a cache, a main memory (main storage device), or the like. The storage device 1002 can retain a program (a program code), a software module, and the like which can be executed to carry out the communication method according to the embodiment of the present disclosure.

The auxiliary storage device 1003 is a computer-readable recording medium, and may be constituted by, for example, at least one of an optical disc such as a compact disc ROM (CD-ROM), a hard disk drive, a flexible disk, a magneto-optical disk (for example, a compact disk, a digital multi-purpose disk, and a Blu-ray (registered trademark) disk), a smart card, a flash memory (for example, a card, a stick, a key drive), a floppy (registered trademark) disk, a magnetic strip, and the like. The auxiliary storage device 1003 may be referred to as an auxiliary storage device. For example, the above-described storage medium may be a database including at least one of the storage device 1002 and the auxiliary storage device 1003, a server, and other appropriate media.

The communication device 1004 is hardware (transmitting and receiving device) that performs communication between computers through at least one of a wired network and a wireless network, and may be referred to as, for example, a network device, a network controller, a network card, a communication module, or the like. For example, the communication device 1004 may include a high-frequency switch, a duplexer, a filter, a frequency synthesizer, and the like to realize at least one of frequency division duplex (FDD) and time division duplex (TDD). For example, a transmitting and receiving antenna, an amplification unit, a transmitting and receiving unit, a transmission path interface, and the like may be realized by the communication device 1004. The transmitting and receiving unit may be mounted in a state of being physically or logically separated into a transmitting unit and a receiving unit.

The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs output to the outside. Note that, the input device 1005 and the output device 1006 may have an integral configuration (for example, a touch panel).

In addition, respective devices such as the processor 1001 and the storage device 1002 are connected to each other through a bus 1007 for information communication. The bus 1007 may be configured by using a single bus, or by using buses different between devices.

In addition, the base station 10 and the terminal 20 may include hardware such as a microprocessor, a digital signal processor (DSP), an application specific integrated circuit (ASIC), a programmable logic device (PLD), and a field programmable gate array (FPGA), or a part or the entirety of respective function blocks may be realized by the hardware. For example, the processor 1001 may be mounted by using least one piece of hardware.

Supplement of Embodiment

Hereinbefore, description has been given of the embodiment of the invention. However, the disclosed invention is not limited to the embodiment, and it should be understood by those skilled in the art that various modification examples, various variation examples, various alternative examples, various substitution examples, and the like can be made. Description has been made by using a specific numerical example for comprehension of the invention, but numerical values are illustrative only, and arbitrary appropriate values may be used unless otherwise stated. The classification of the items in the above description is not essential in the invention, and details described in two or more items may be used in combination as necessary. In addition, details described in any item may be applied to details described in a different item (as long as inconsistency does not occur). It cannot be said that the boundary of the function units in the functional block diagrams or the processing units corresponds to a boundary of physical components. Operations of a plurality of function units may be performed physically with one component, or an operation of one function unit may be performed physically with a plurality of components. With regard to the procedures described in the embodiment, the order thereof may be changed as long as inconsistency does not occur. The base station 10 and the terminal 20 have been described by using functional block diagrams for convenience of processing explanation, but the devices may be realized by hardware, software, or a combination thereof. Software that operates by the processor provided to the base station 10 in accordance with the embodiment of the invention, and software that operates by the processor provided to the terminal 20 in accordance with the embodiment of the invention may be respectively stored in a random access memory (RAM), a flash memory, a read only memory (ROM), an EPROM, an EEPROM, a register, a hard disk drive (HDD), a removable disk, a CD-ROM, a database, a server, or other appropriate storage media.

In addition, information notification may be performed by other methods without limitation to the aspect and the embodiment described in the present disclosure. For example, the information notification may be performed by physical layer signaling (for example, downlink control information (DCI), and uplink control information (UCI)), higher layer signaling (for example, radio resource control (RRC) signaling, medium access control (MAC) signaling, notification information (master information block (MIB)), and system information block (SIB)), other signals, or a combination thereof. In addition, the RRC signaling may be referred to as an RRC message, and examples thereof include an RRC connection setup message, an RRC connection reconfiguration message, and the like.

The aspect and embodiment which are described in the present disclosure may also be applied to at least any one of long term evolution (LTE), LTE-Advanced (LTE-A), SUPER 3G, IMT-Advanced, 4th generation mobile communication system (4G), 5th generation mobile communication system (5G), future radio access (FRA), new radio (NR), W-CDMA (registered trademark), GSM (registered trademark), CDMA2000, ultra mobile broadband (UMB), IEEE 802.11 (Wi-Fi (registered trademark)), IEEE 802.16 (WiMAX (registered trademark)), IEEE 802.20, ultra-wideband (UWB), Bluetooth (registered trademark), other systems which use an appropriate system, and a next generation system that is extended on the basis of the systems. In addition, application can be made in combination of a plurality of the systems (for example, in combination of at least one of LTE and LTE-A, and 5G).

With regard to the procedure, the sequence, the flowchart, and the like in the aspect and the embodiment which are described in this specification, the order thereof may be changed as long as inconsistency does not occur. For example, with regard to the method that is described in the present disclosure, elements of various steps are suggested in an exemplary order, and there is no limitation to the specific order that is suggested.

In this specification, a specific operation that is performed by the base station 10 may be performed by a higher node (upper node) according to circumstances. In a network including one or a plurality of network nodes including the base station 10, it is apparent that various operations which are performed for communication with the terminal 20 can be performed by at least one of the base station 10 and another network node (for example, MME, S-GW (golden week), or the like is considered, but there is no limitation thereto) other than the base station 10. In the above description, a case where another network node other than the base station 10 is one is exemplified, but the other network node may be a combination (for example, MME and S-GW (golden week)) of a plurality of other network nodes.

The information, the signal, and the like which are described in the present disclosure may be output from a higher layer (or a lower layer) to the lower layer (or the higher layer). The information, the signal, and the like may be input or output through a plurality of network nodes.

Information that is input or output, and the like may be stored in a specific location (for example, a memory), or may be managed by a management table. The information that is input or output, and the like may be subjected to rewriting, updating, or additional writing. The information that is output, and the like may be deleted. The information that is input, and the like may be transmitted to other devices.

Determination in the present disclosure may be performed by a value (0 or 1) that is expressed by one bit, may be performed in accordance with a truth value (Boolean: true or false), or may be performed through numerical value comparison (for example, comparison with a predetermined value).

Even when being referred to as software, firmware, middleware, microcode, hardware description language, or other names, the software should be broadly interpreted to mean instructions, instruction sets, codes, code segments, program codes, programs, subprograms, software modules, applications, software applications, software packages, routines, subroutines, objects, executable files, execution threads, procedures, functions, and the like.

In addition, the software, instructions, information, and the like may be transmitted or received through a transmission medium. For example, in a case where the software is transmitted from a web site, a server, or other remote sources by using at least one of a wired technology (a coaxial cable, an optical fiber cable, a twisted pair, a digital subscriber line (DSL), or the like) and a wireless technology (infrared, microwave, or the like), at least one of these wired and wireless technologies is included in the definition of the transmission medium.

The information, the signals, and the like, which are described in the present disclosure, may be expressed by using any one of other various technologies. For example, data, an instruction, a command, information, a signal, a bit, a symbol, a chip, and the like, which are stated over the entirety of the above description, may be expressed by a voltage, a current, an electromagnetic wave, a magnetic field or a magnetic particle, a photo field or a photon, or an arbitrary combination thereof.

Note that, terms described in the present disclosure and terms necessary for understanding of the present disclosure may be substituted with terms having the same or similar meaning. For example, at least one of the channel and the symbol may be a signal (signaling). In addition, the signal may be a message. In addition, the component carrier (CC) may be referred to as a carrier frequency, a cell, a frequency carrier, or the like.

The terms of "system" and "network" used in the present disclosure are compatibly used.

In addition, information, parameters, and the like which are described in the present disclosure may be expressed by using absolute values, may be expressed by using relative values from predetermined values, or may be expressed by using additional corresponding information. For example, the radio resource may be indicated by an index.

The names used for the above-described parameters are not restrictive in any way. In addition, mathematical formulas and the like using these parameters may be different from those explicitly disclosed in the present disclosure. Since various channels (for example, a PUSCH, a PUCCH, a PDCCH, and the like) and information elements can be identified by any suitable name, the various names allocated to these various channels and information elements are not limited names in any way.

In the present disclosure, terms such as a "base station (BS)", a "radio base station", a "base station", a "fixed station", a "NodeB", an "eNodeB (eNB)", a "gNodeB (gNB)", an "access point", a "transmission point", a "reception point", a "transmission and reception point", a "cell", a "sector", a "cell group", a "carrier", and a "component carrier" may be compatibly used. The base station may also be referred to as terms such as a macro cell, a small cell, a femto cell, and a pico cell.

The base station can accommodate one or a plurality of (for example, three) cells. In a case where the base station accommodates the plurality of cells, the entirety of a coverage area of the base station can be classified into a plurality of small areas, and each of the small areas can provide a communication service by a base station subsystem (for example, an indoor small base station (remote radio head (RRH)). A term of a "cell" or a "sector" represents a part or the entirety of a coverage area of at least one of the base station and the base station subsystem which provide the communication service in the coverage.

In the present disclosure, the terms such as a "mobile station (MS)", a "user terminal", a "user equipment (UE)", and a "terminal" can be compatibly used.

The mobile station may be defined by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a terminal, a wireless terminal, a remote terminal, a handset, a user agent, a mobile client, a client, or several other appropriate terminologies.

At least one of the base station and the mobile station may be referred to as a transmission device, a reception device, a communication device, or the like. Note that, at least one of the base station and the mobile station may be a device mounted on a moving body, the moving body itself, or the like. The moving body may be a vehicle (for example, a car, an airplane, or the like), an unmanned moving body (for example, a drone, an automatic driving vehicle, or the like), or a robot (a manned type or an unmanned type). Note that, at least one of the base station and the mobile station includes a device that does not necessarily move during a communication operation. For example, at least one of the base station and the mobile station may be an Internet of thing (IoT) device such as a sensor.

In addition, the base station in the present disclosure may be read as a terminal. For example, the aspect/embodiment of the present disclosure may be applied to a configuration in which the communication between the base station and the terminal is substituted with communication between a plurality of terminals 20 (for example, may be referred to as a device-to-device (D2D), vehicle-to-everything (V2X), or the like). In this case, a function provided to the base station 10 may be set to a configuration of the terminal 20. In addition, words such as "up" and "down" may be read as words (for example, "side") corresponding to communication between terminals. For example, an uplink channel, a downlink channel, and the like may be read as a side channel.

Similarly, the terminal in the present disclosure may be read as a base station. In this case, the function provided in the terminal may be set as a configuration of the base station.

The term "determining" that is used in the present disclosure may include various operations. For example, the term "determining" may include regarding of judging, calculating, computing, processing, deriving, investigating, looking up (search, inquiry) (for example, looking up in a table, a database, or other data structures), or ascertaining as "determined", and the like. In addition, the "determining" may include regarding of receiving (for example, information receiving), transmitting (for example, information transmitting), input, output, or accessing (for example, accessing to data in a memory) as "determined", and the like. In addition, "determining" may include regarding of resolving, selecting, choosing, establishing, comparing, or the like as "determining". That is, "determining" includes regarding of any operation as "determined". In addition, "determining" may be read as "assuming", "expecting", "considering", or the like.

A term of "connected", "coupled", or any variation thereof represents any direct or indirect connection or coupling between two or more elements and can include presence of one or more intermediate elements between two "connected" or "coupled" elements. The coupling or connection between the elements may be physical, logical, or a combination thereof. For example, "connection" may be read as "access". In a case of being used in the present disclosure, it can be considered that the two elements are "connected" or "coupled" to each other by using at least one of one or more wires, a cable, and printed electrical connection, and by using electromagnetic energy having a wavelength in a radio frequency domain, a microwave domain, and an optical (both visible and invisible) domain as several non-limiting and non-inclusive examples.

A reference signal may be abbreviated as RS (reference signal), and may be referred to as a pilot in accordance with an applied standard.

Description of "on the basis of" in the present disclosure does not represent "only on the basis of" unless otherwise stated. In other words, description of "on the basis of" represents both "only on the basis of" and "at least on the basis of".

Any reference to elements which use a term such as "first" and "second" in the present disclosure does not generally limit the amount or the sequence of the elements. These terms can be used in the present disclosure as a convenient method of distinguishing two or more elements. Accordingly, reference to the first and second elements does not mean that only two elements can be employed, or that the first element must precede the second element in some way.

The "unit" in the configuration of each of the devices may be substituted with "portion", "circuit", "device", or the like.

In the present disclosure, in a case where "include", "including", and a modification thereof are used, these terms are intended as comprehensive terms similar to "comprising". In addition, a term "or" that is used in the present disclosure is not intended as an exclusive-OR.

A radio frame may be configured by one or a plurality of frames in a time domain. The one or the plurality of frames in the time domain may be referred to as a subframe. The subframe may be further configured by one or a plurality of slots in the time domain. The subframe may be a fixed time length (for example, 1 ms) that does not depend on numerology.

The numerology may be a communication parameter that is applied to at least one of transmission and reception of an arbitrary signal or channel. For example, the numerology may represent at least one of a subcarrier spacing (SCS), a bandwidth, a symbol length, a cyclic prefix length, a transmission time interval (TTI), the number of symbols per the TTI, a radio frame configuration, specific filtering processing performed by a transceiver in a frequency domain, specific window INGNI processing performed by the transceiver in the time domain, and the like.

The slot may be configured by one or a plurality of symbols (orthogonal frequency division multiplexing (OFDM) symbols, single carrier frequency division multiple access (SC-FDMA) symbols, or the like) in a time domain. The slot may be a time unit based on the numerology.

The slot may include a plurality of mini slots. Each of the mini slots may be configured by one or a plurality of symbols in the time domain. In addition, the mini slot may be referred to as a sub-slot. The mini slot may be configured by symbols in a number smaller in comparison to the slot. A PDSCH (or a PUSCH) that is transmitted in a time unit greater than the mini slot may be referred to as a PDSCH (or PUSCH) mapping type A. The PDSCH (or PUSCH) transmitted by using the mini slot may be referred to as a PDSCH (or PUSCH) mapping type B.

Any of the radio frame, the subframe, the slot, the mini slot, and the symbol represent a time unit when transmitting signals. With regard to the radio frame, the subframe, the slot, the mini slot, and the symbol, additional names corresponding thereto may be used.

For example, one subframe may be referred to as a transmission time interval (TTI), a plurality of continuous subframes may be referred to as the TTI, or one slot or one mini slot may be referred to as the TTI. That is, at least one of the subframe and the TTI may be a subframe (1 ms) in existing LTE, may be a period (for example, 1 to 13 symbols) shorter than 1 ms, or may be a period longer than 1 ms. Note that, a unit indicating the TTI may be referred to as a slot, a mini slot, or the like instead of the subframe.

Here, for example, the TTI represents a minimum time unit of scheduling in the radio communication. For example, in an LTE system, the base station performs scheduling for allocating a radio resource (a frequency bandwidth, transmission power, or the like that can be used in each terminal 20) to each terminal 20 in a TTI unit. Note that, definition of the TTI is not limited thereto.

The TTI may be a transmission time unit such as a channel encoded data packet (transport block), a code block, and a codeword, or may be a processing unit of scheduling, link, and adaptation. Note that, when the TTI is given, the time interval (for example, the number of symbols) in which the transport block, the code block, the codeword, or the like is actually mapped may be shorter than the TTI.

Note that, in a case where one slot or one mini slot is referred to as the TTI, one or more TTIs (that is, one or more slots or one or more mini slots) may be the minimum time unit of the scheduling. In addition, the number of slots (the number of mini slots) constituting the minimum time unit of the scheduling may be controlled.

The TTI having a time length of 1 ms may be referred to as a typical TTI (TTI in LTE Rel. 8-12), a normal TTI, a long TTI, a typical subframe, a normal subframe, a long subframe, a slot, or the like. A TTI shorter than the typical TTI may be referred to as a shortened TTI, a short TTI, a partial TTI (or fractional TTI), a shortened subframe, a short subframe, a mini slot, a subslot, a slot, or the like.

Note that, the long TTI (for example, the typical TTI, the subframe, and the like) may be read as a TTI having a time length longer than 1 ms, and the short TTI (for example, the shortened TTI and the like) may be read as a TTI having a TTI length that is less than the TTI length of the long TTI and equal to or greater than 1 ms.

The resource block (RB) is a resource allocation unit of the time domain and the frequency domain and may include one subcarrier or a plurality of continuous subcarriers in the frequency domain. The number of subcarriers included in the RB may be the same regardless of the numerology, and may be, for example, 12. The number of subcarriers included in the RB may be determined on the basis of the numerology.

In addition, the time domain of the RB may include one or a plurality of symbols, and may be a length of one slot, one mini slot, one subframe, or one TTI. The one TTI, the one subframe, and the like may be configured one or a plurality of resource blocks.

Note that, one or a plurality of RBs may be referred to as a physical resource block (PRB: physical RB), a sub-carrier group (SCG), a resource element group (REG), a PRB pair, an RB pair, or the like.

In addition, the resource block may be configured by one or a plurality of resource elements (REs). For example, 1 RE may be a radio resource domain of one subcarrier and one symbol.

A bandwidth part (BWP) (may be referred to as a partial bandwidth or the like) may represent a subset of continuous common resource blocks (RB) which are continuous for an arbitrary numerology in an arbitrary carrier. Here, the common RB may be specified by an index of an RB with a common reference point of the carrier set as a reference. The PRB may be defined by an arbitrary BWP, and may be numbered in the BWP.

The BWP may include BWP for UL (UL BWP) and BWP for DL (DL BWP). With respect to the UE, one or a plurality of BWPs may be set in one carrier.

At least one of the BWPs which are set may be active, and the UE may not assume that a predetermined signal/channel is transmitted and received at the outside of the active BWP. Note that, "cell", "carrier", and the like in the present disclosure may be read as "BWP".

The structure of the radio frame, the subframe, the slot, the mini slot, the symbol, and the like is illustrative only. For example, the configuration of the number of subframes included in the radio frame, the number of slots per the subframe or the radio frame, the number of the mini slots included in the slot, the number of symbols and RBs included in the slot or the mini slot, the number of subcarriers included in the RB, the number of symbols in the TTI, the symbol length, the cyclic prefix (CP) length, and the like can be changed in various manners.

In the present disclosure, for example, in a case where articles such as "a", "an", and "the" are added in translation, nouns subsequent to the articles are intended to include a plural form.

In the present disclosure, a term of "A and B are different" may represent "A and B are different from each other". Note that, the term may represent "A and B are different from C". Terms such as "separated" and "coupled" may be interpreted in the same manner as in "different".

The aspect and the embodiment which are described in the present disclosure may be used alone or in combination thereof, or may be switched and used in accordance with execution. In addition, notification of predetermined information (for example, notification of "a fact of X") is not limited to the explicit notification, and may be performed in an implicit manner (for example, notification of the predetermined information is not performed).

Note that, in the present disclosure, the SS block or the CSI-RS is an example of a synchronization signal or a reference signal.

Hereinbefore, the present disclosure has been described in detail, but it is apparent by those skilled in the art that the present disclosure is not limited to the embodiment described in the present disclosure. The present disclosure can be executed as a variation aspect and a modification aspect without departing from the gist and the scope of the present disclosure which are determined by description of the appended claims. Accordingly, description in the present disclosure is made for exemplary explanation, and does not have any limiting meaning with respect to the present disclosure.

EXPLANATIONS OF LETTERS OR NUMERALS

10 BASE STATION
110 TRANSMITTING UNIT

120 RECEIVING UNIT
130 SETTING UNIT
140 CONTROL UNIT
20 TERMINAL
210 TRANSMITTING UNIT
220 RECEIVING UNIT
230 SETTING UNIT
240 CONTROL UNIT
1001 PROCESSOR
1002 STORAGE DEVICE
1003 AUXILIARY STORAGE DEVICE
1004 COMMUNICATION DEVICE
1005 INPUT DEVICE
1006 OUTPUT DEVICE

The invention claimed is:

1. A terminal comprising:
a receiving unit that acquires any one or both position information of a reception terminal and position information of a third terminal; and
a control unit that performs resource exclusion processing by a specific method with respect to a reserved resource by the third terminal within a specific range from the reception terminal on the basis of the position information acquired by the receiving unit in identification processing of candidates of a transmission resource that is used in a sidelink,
wherein the control unit corrects a threshold value based on a priority of the third terminal which is used in the resource exclusion processing.

2. The terminal according to claim 1, wherein the control unit,
excludes the reserved resource from the set of the candidates without depending on a reception power of a signal received from the third terminal, or
corrects a reception power that is used in the resource exclusion processing.

3. A terminal comprising:
a receiving unit that acquires any one or both position information of a reception terminal and position information of a third terminal; and
a control unit that preferentially selects a resource other than a reserved resource by the third terminal within a specific range from the reception terminal on the basis of the position information acquired by the receiving unit in resource selection processing of selecting a transmission resource that is used from a set of candidates of a transmission resource that is used in a sidelink,
wherein the control unit corrects a selection probability based on the position information acquired by the receiving unit.

4. The terminal according to claim 3, wherein the control unit,
uses selection probability lower than selection probability of a resource other than the reserved resource as selection probability of the reserved resource, or
in a case where a resource other than the reserved resource exists in the set of the candidates, selects the resource.

5. A terminal comprising:
a receiving unit that acquires any one or both position information of a reception terminal and position information of a third terminal; and
a control unit that selects a transmission resource scheduled to be used from a set of candidates of a transmission resource that is used in a sidelink, and determines whether or not to perform an operation related to pre-emption depending on whether or not the reception terminal and the third terminal are within a specific range on the basis of the position information acquired by the receiving unit in a case where the transmission resource scheduled to be used is reserved by the third terminal,
wherein the operation related to pre-emption selects the transmission resource to be used based on a priority of the third terminal.

6. A resource control method executed by a terminal, the method comprising:
a reception step of acquiring any one or both position information of a reception terminal and position information of a third terminal; and
a step of performing resource exclusion processing by a specific method with respect to a reserved resource by the third terminal within a specific range from the reception terminal on the basis of the position information acquired by the reception step in identification processing of candidates of a transmission resource that is used in a sidelink,
wherein a threshold value is corrected based on a priority of the third terminal which is used in the resource exclusion processing.

* * * * *